(12) United States Patent
Alexanian

(10) Patent No.: US 7,962,244 B2
(45) Date of Patent: *Jun. 14, 2011

(54) LANDSCAPE IRRIGATION TIME OF USE SCHEDULING

(76) Inventor: George Alexanian, Fresno, CA (US)

( * ) Notice: Subject to any disclaimer, the term of this patent is extended or adjusted under 35 U.S.C. 154(b) by 490 days.

This patent is subject to a terminal disclaimer.

(21) Appl. No.: 12/011,801

(22) Filed: Jan. 30, 2008

(65) Prior Publication Data

US 2008/0154437 A1    Jun. 26, 2008

Related U.S. Application Data

(63) Continuation-in-part of application No. 11/879,700, filed on Jul. 17, 2007, now Pat. No. 7,844,368, which is a continuation-in-part of application No. 11/336,690, filed on Jan. 20, 2006, now Pat. No. 7,266,428, which is a continuation-in-part of application No. 10/824,667, filed on Apr. 13, 2004, now Pat. No. 7,058,478.

(60) Provisional application No. 60/465,457, filed on Apr. 25, 2003, provisional application No. 60/899,200, filed on Feb. 1, 2007, provisional application No. 61/000,066, filed on Oct. 22, 2007.

(51) Int. Cl.
*G05D 11/00* (2006.01)
*A01G 25/00* (2006.01)

(52) U.S. Cl. .......................................... 700/284; 239/69

(58) Field of Classification Search .................. 700/284; 239/67–70, 723; 137/78.1–78.3, 624.11–624.15, 137/624.21; 405/36, 37
See application file for complete search history.

(56) References Cited

U.S. PATENT DOCUMENTS

| | | |
|---|---|---|
| 3,114,243 A | 12/1963 | Winters |
| 3,372,899 A | 3/1968 | McPherson |
| 3,653,595 A | 4/1972 | Greengard |
| 3,726,477 A | 4/1973 | Shapiro |
| 3,787,728 A | 1/1974 | Bayer et al. |
| 3,902,825 A | 9/1975 | Quillen |
| 4,010,898 A | 3/1977 | Williams |
| 4,146,049 A | 3/1979 | Kruse et al. |
| 4,176,395 A | 11/1979 | Evelyn-Veere et al. |
| 4,185,650 A | 1/1980 | Neves |
| 4,208,630 A | 6/1980 | Martinez |
| 4,209,131 A | 6/1980 | Barash |
| 4,333,490 A | 6/1982 | Enter, Sr. |
| RE31,023 E | 9/1982 | Hall, III |

(Continued)

OTHER PUBLICATIONS

Web pages (5); List of Principal Symbols and Acronyms; 2003.

(Continued)

*Primary Examiner* — M. N. Von Buhr
(74) *Attorney, Agent, or Firm* — Mark D. Miller

(57) ABSTRACT

A number of water related issues concern most communities. Among these are the availability of water, and the ability of the existing infrastructure to efficiently pump and deliver that water without wasting energy. The present invention addresses these issues with respect to landscape water use. A preferred embodiment of the present invention is an add-on module that may be programmed with local watering restrictions including time of use (TOU), and that is connected to the output of any existing landscape irrigation controller. The module is programmed to not allow watering during certain times of day or certain days of the week as established by a local water authority or municipality. Embodiments of the invention also provide methods and apparatus for updating the local watering restrictions, and integrating the present invention into existing controllers.

55 Claims, 16 Drawing Sheets

U.S. PATENT DOCUMENTS

| | | | |
|---|---|---|---|
| 4,396,149 A | 8/1983 | Hirsch | |
| 4,396,150 A | 8/1983 | Burrough | |
| 4,431,338 A | 2/1984 | Hornabrook | |
| 4,526,034 A | 7/1985 | Campbell | |
| 4,545,396 A | 10/1985 | Miller et al. | |
| 4,548,225 A | 10/1985 | Busalacchi | |
| 4,569,020 A | 2/1986 | Snoddy et al. | |
| 4,613,764 A | 9/1986 | Lobato | |
| 4,626,984 A | 12/1986 | Unruh | |
| 4,646,224 A | 2/1987 | Ransburg | |
| 4,684,920 A | 8/1987 | Reiter | |
| 4,691,341 A | 9/1987 | Knoble | |
| 4,709,585 A | 12/1987 | Altenhofen | |
| 4,755,942 A | 7/1988 | Gardner et al. | |
| 4,837,499 A | 6/1989 | Scherer, III | |
| 4,852,802 A | 8/1989 | Iggulden et al. | |
| 4,856,227 A | 8/1989 | Oglevee | |
| 4,858,377 A | 8/1989 | Oglevee | |
| 4,876,647 A | 10/1989 | Gardner et al. | |
| 4,921,001 A | 5/1990 | Pittsinger | |
| 4,922,433 A | 5/1990 | Mark | |
| 4,934,400 A | 6/1990 | Cuming | |
| 4,952,868 A | 8/1990 | Scherer | |
| 4,962,522 A | 10/1990 | Marian | |
| 4,967,789 A | 11/1990 | Kypris | |
| 4,992,942 A | 2/1991 | Bauerle et al. | |
| 5,023,787 A | 6/1991 | Evelyn-Veere | |
| 5,097,861 A | 3/1992 | Hopkins et al. | |
| 5,101,083 A | 3/1992 | Tyler | |
| 5,121,340 A | 6/1992 | Campbell | |
| 5,148,826 A | 9/1992 | Bakhshaei | |
| 5,208,855 A | 5/1993 | Marian | |
| 5,229,937 A | 7/1993 | Evelyn-Veere | |
| 5,244,177 A | 9/1993 | Campbell | |
| 5,321,578 A | 6/1994 | Morrison et al. | |
| 5,341,831 A | 8/1994 | Zur | |
| 5,355,122 A | 10/1994 | Erickson | |
| 5,444,611 A | 8/1995 | Woytowitz et al. | |
| 5,445,176 A | 8/1995 | Goff | |
| 5,465,904 A | 11/1995 | Vaello | |
| 5,479,338 A * | 12/1995 | Ericksen et al. | 700/16 |
| 5,479,339 A | 12/1995 | Miller | |
| 5,638,847 A | 6/1997 | Hoch, Jr. et al. | |
| 5,696,671 A | 12/1997 | Oliver | |
| 5,839,660 A | 11/1998 | Morgenstern et al. | |
| 5,853,122 A | 12/1998 | Caprio | |
| 5,870,302 A | 2/1999 | Oliver | |
| 5,921,280 A | 7/1999 | Ericksen et al. | |
| 5,960,813 A | 10/1999 | Sturman et al. | |
| 6,076,740 A | 6/2000 | Townsend | |
| 6,088,621 A | 7/2000 | Woytowitz | |
| 6,098,898 A * | 8/2000 | Storch | 239/69 |
| 6,102,061 A | 8/2000 | Addink | |
| 6,145,755 A | 11/2000 | Feltz | |
| 6,227,220 B1 | 5/2001 | Addink | |
| 6,259,955 B1 * | 7/2001 | Brundisini et al. | 700/15 |
| 6,267,298 B1 * | 7/2001 | Campbell | 239/70 |
| 6,298,285 B1 | 10/2001 | Addink et al. | |
| 6,314,340 B1 | 11/2001 | Mecham et al. | |
| 6,343,255 B1 | 1/2002 | Peek et al. | |
| 6,401,742 B1 | 6/2002 | Cramer et al. | |
| 6,452,499 B1 | 9/2002 | Runge et al. | |
| 6,453,215 B1 | 9/2002 | Lavoie | |
| 6,453,216 B1 | 9/2002 | McCabe et al. | |
| 6,585,168 B1 | 7/2003 | Caprio | |
| 6,589,033 B1 | 7/2003 | Johnson et al. | |
| 6,675,098 B2 | 1/2004 | Peek et al. | |
| 6,714,134 B2 | 3/2004 | Addink et al. | |
| 6,748,327 B1 | 6/2004 | Watson | |
| 6,766,817 B2 | 7/2004 | da Silva | |
| 6,823,239 B2 | 11/2004 | Sieminski | |
| 6,892,113 B1 | 5/2005 | Addink et al. | |
| 6,892,114 B1 | 5/2005 | Addink et al. | |
| 6,895,987 B2 | 5/2005 | Addink et al. | |
| 6,918,404 B2 | 7/2005 | da Silva | |
| 6,944,523 B2 | 9/2005 | Addink | |
| 6,947,811 B2 | 9/2005 | Addink et al. | |
| 6,950,728 B1 | 9/2005 | Addink et al. | |
| 6,963,808 B1 | 11/2005 | Addink et al. | |
| 7,010,394 B1 | 3/2006 | Runge et al. | |
| 7,048,204 B1 | 5/2006 | Addink et al. | |
| 7,050,887 B2 | 5/2006 | Alvarez | |
| 7,058,478 B2 | 6/2006 | Alexanian | |
| 7,058,479 B2 * | 6/2006 | Miller | 700/284 |
| 7,066,586 B2 | 6/2006 | da Silva | |
| 7,096,094 B2 | 8/2006 | Addink et al. | |
| 7,236,908 B2 * | 6/2007 | Timko et al. | 702/176 |
| 7,243,005 B1 | 7/2007 | Beutler et al. | |
| 7,248,945 B2 | 7/2007 | Woytowitz | |
| 7,266,428 B2 | 9/2007 | Alexanian | |
| 7,286,904 B2 | 10/2007 | Graham | |
| 7,317,972 B2 | 1/2008 | Addink et al. | |
| 7,330,796 B2 | 2/2008 | Addink et al. | |
| 7,337,042 B2 | 2/2008 | Marian | |
| 7,363,113 B2 | 4/2008 | Runge et al. | |
| 7,403,840 B2 | 7/2008 | Moore et al. | |
| 7,412,303 B1 | 8/2008 | Porter et al. | |
| 7,430,458 B2 | 9/2008 | Dansereau et al. | |
| 7,444,207 B2 | 10/2008 | Nickerson et al. | |
| 7,513,755 B2 | 4/2009 | Geisinger et al. | |
| 7,532,954 B2 | 5/2009 | Evelyn-Veere et al. | |
| 7,552,632 B2 | 6/2009 | Runge et al. | |
| 7,584,023 B1 | 9/2009 | Palmer et al. | |
| 7,596,429 B2 | 9/2009 | Cardinal et al. | |
| 7,613,546 B2 | 11/2009 | Nelson et al. | |
| 7,640,079 B2 | 12/2009 | Nickerson et al. | |
| 7,805,221 B2 | 9/2010 | Nickerson | |
| 2001/0049563 A1 | 12/2001 | Addink et al. | |
| 2002/0002425 A1 * | 1/2002 | Dossey et al. | 700/284 |
| 2002/0010516 A1 | 1/2002 | Addink | |
| 2002/0020441 A1 | 2/2002 | Addink | |
| 2002/0027504 A1 | 3/2002 | Davis | |
| 2002/0060631 A1 | 5/2002 | Runge et al. | |
| 2002/0072829 A1 | 6/2002 | Addink et al. | |
| 2002/0091452 A1 | 7/2002 | Addink | |
| 2002/0092965 A1 | 7/2002 | Addink | |
| 2003/0025400 A1 | 2/2003 | Hall | |
| 2003/0080199 A1 | 5/2003 | Condreva | |
| 2003/0109964 A1 | 6/2003 | Addink | |
| 2003/0178070 A1 * | 9/2003 | Glicken | 137/624.11 |
| 2003/0179102 A1 | 9/2003 | Barnes | |
| 2003/0182022 A1 | 9/2003 | Addink | |
| 2003/0183018 A1 | 10/2003 | Addink et al. | |
| 2003/0208306 A1 | 11/2003 | Addink | |
| 2003/0230638 A1 | 12/2003 | Dukes et al. | |
| 2004/0011880 A1 | 1/2004 | Addink et al. | |
| 2004/0015270 A1 | 1/2004 | Addink | |
| 2004/0039489 A1 | 2/2004 | Moore et al. | |
| 2004/0089164 A1 | 5/2004 | Addink | |
| 2004/0117070 A1 | 6/2004 | Barker | |
| 2004/0217189 A1 | 11/2004 | Ueno | |
| 2005/0019184 A1 | 1/2005 | Geisinger et al. | |
| 2005/0137752 A1 | 6/2005 | Alvarez | |
| 2005/0250440 A1 | 11/2005 | Zhou et al. | |
| 2006/0043208 A1 | 3/2006 | Graham | |
| 2006/0091245 A1 | 5/2006 | Ivans | |
| 2006/0116792 A1 | 6/2006 | Addink | |
| 2006/0122735 A1 * | 6/2006 | Goldberg et al. | 700/284 |
| 2006/0155489 A1 | 7/2006 | Addink | |
| 2006/0217846 A1 | 9/2006 | Woytowitz | |
| 2006/0293797 A1 | 12/2006 | Weiler | |
| 2007/0179674 A1 | 8/2007 | Ensworth et al. | |
| 2007/0191991 A1 | 8/2007 | Addink | |
| 2007/0221744 A1 * | 9/2007 | Simon et al. | 239/67 |
| 2007/0282486 A1 * | 12/2007 | Walker et al. | 700/284 |
| 2007/0293990 A1 | 12/2007 | Alexanain | |
| 2008/0027586 A1 | 1/2008 | Hern et al. | |
| 2008/0154437 A1 | 6/2008 | Alexanian | |
| 2009/0043427 A1 | 2/2009 | Addink | |
| 2009/0138105 A1 | 5/2009 | Crawford | |
| 2009/0202366 A1 | 8/2009 | Geisinger et al. | |
| 2010/0030476 A1 | 2/2010 | Woytowitz | |
| 2010/0094472 A1 | 4/2010 | Woytowitz | |
| 2010/0106337 A1 | 4/2010 | Sacks | |
| 2010/0145530 A1 | 6/2010 | Nickerson | |

OTHER PUBLICATIONS

Article (3 pgs); Methods to Calculate Evapotranspiration Differences and Choices; by Cattaneo & Upham.
Article (2 pgs); Water-Efficient Landscaping; 2001.
Article (19 pgs); Appendix G Deficit Irrigation Practice; from Turf and Landscape Irrigation Best Management Practive by the Irrigation Association—Water Management Committe.
Article CTAHR Fact Shee (1pg); A Simple Evapotranspiration Model for Hawaii; Teh Hargreaves Model; Engeineer's Notebook No. 106 May 1997; by Wu.
Web Page (1pg); Technical Information-Using Evapotranspiration Data; Nov. 2002; by Austin Lawn Sprinkler Association.
Chart (1 pg); ET Different Formula.
Preface page Web Page (1 pg); by USFAO; Feb. 2003.
US Department of the Interior Bureau of Reclamation Lower Colorado Region Southern California Area Office Souther CA. Area Office Temecula, CA & Technical Service Center Water Resouces Planning Operations Support Group, Denver, CO.;Westher & Soil Moisture Based Landscape Irrigation Scheduling Devices; Reclamation Managing Water in the West Aug. 2007; 135 pgs; U.S. Department of the Interior Bureau of Reclamation Lower Colorado Region Southern California Area Office.
Hunt, T. and Lessick, D. et al., Residential Weather-Based Irrigation Scheduling: Evidence from the Irvine "ET Controller" Study (2001).
Instructions, Model PK-1B pump controller, Mar. 1993.
"Irrigation & Green Industry" Magazine, Nov. 2010.
Universal Smart Module brochure, Aug. 2009.
Smart Clock Brochure, original from approx. May 2007.
Enercon Plus Brochure, original from approx. May 2007.
WeatherSmartPro brochure, Mar. 2010.
SolarSync brochure, Oct. 2099.
Aqua Conserve User's Guide, Jun. 2010.
Aqua Conserve ET-8 Series Manual, 2010.
Climate Logic wireless weather sensing system flyer, Nov. 2010.
WeatherSmart manual, Mar. 2010.

* cited by examiner

DROUGHT WATERING RESTRICTIONS

All water users have been assigned a watering group. Mandatory restrictions mean you may only run sprinklers on your group's allowed watering day(s). To locate your group, check your bill, visit snwa.com or call your water provider.

My assigned group: _____

| Watering Group | Winter | Spring / Fall | Summer |
|---|---|---|---|
| A | Monday | Monday, Wednesday, Friday | Any day |
| B | Tuesday | Tuesday, Thursday, Saturday | Any day |
| C | Wednesday | Monday, Wednesday, Friday | Any day |
| D | Thursday | Tuesday, Thursday, Saturday | Any day |
| E | Friday | Monday, Wednesday, Friday | Any day |
| F | Saturday | Tuesday, Thursday, Saturday | Any day |

For watering instructions, see inside panel.

FIG 2

[Prior Art]

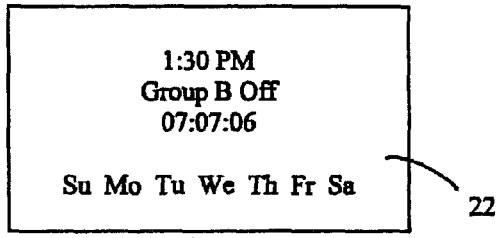

FIG 3

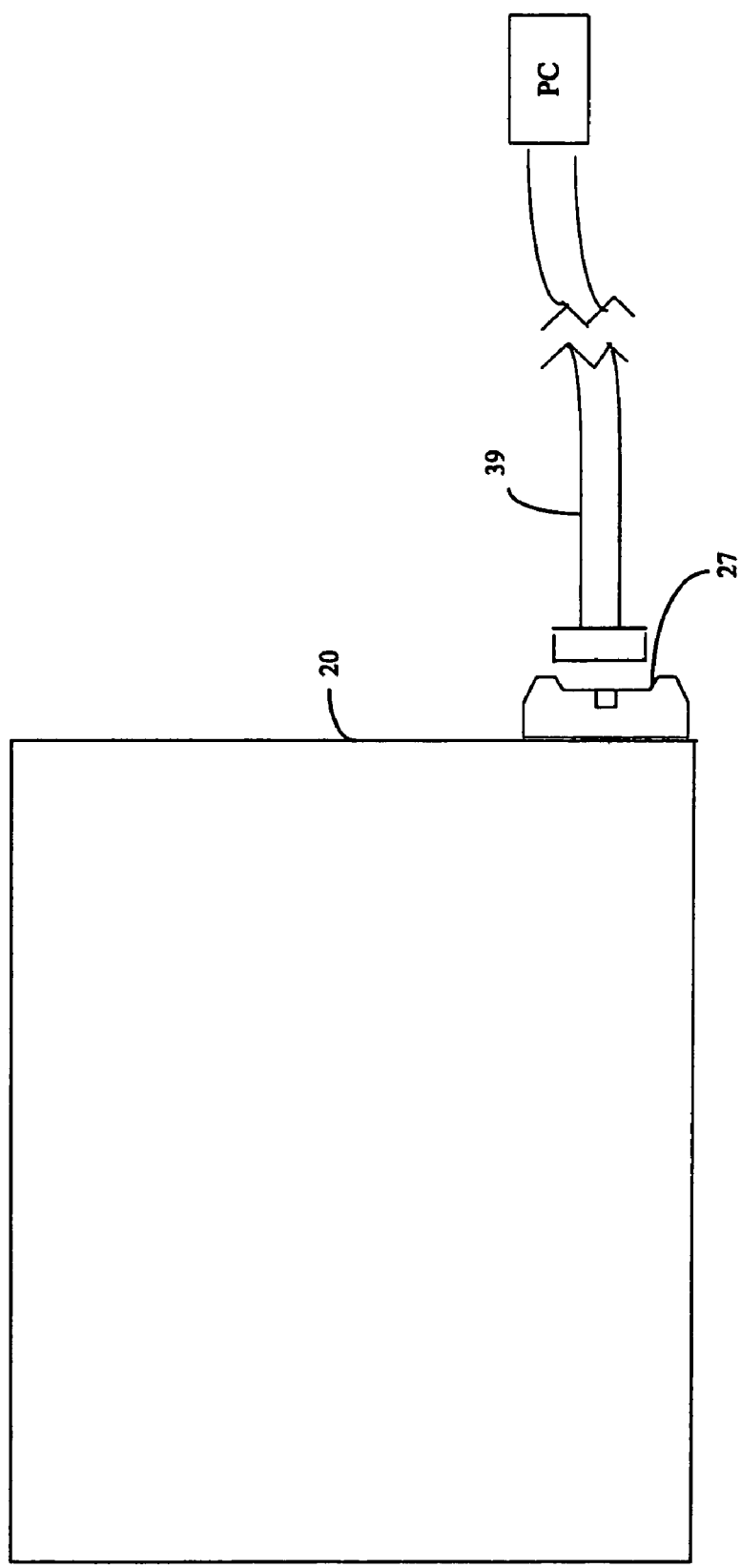

LANDSCAPE IRRIGATION TIME OF USE SCHEDULING

This is a continuation-in-part of U.S. application Ser. No. 11/879,700 filed on Jul. 17, 2007, which is a continuation-in-part of U.S. Utility patent application Ser. No. 11/336,690 filed on Jan. 20, 2006, now U.S. Pat. No. 7,266,428, which is a continuation-in-part of U.S. Utility patent application Ser. No. 10/824,667 filed on Apr. 13, 2004, now U.S. Pat. No. 7,058,478, which claims the benefit of U.S. Provisional Application No. 60/465,457 filed on Apr. 25, 2003, all of which are incorporated herein in their entirety by this reference. This application also claims the benefit of U.S. Provisional Patent Application No. 60/899,200 filed on Feb. 1, 2007, and U.S. Provisional Patent Application No. 61/000,066 filed on Oct. 22, 2007, which are also incorporated herein in their entirety by this reference.

BACKGROUND OF THE INVENTION

The present invention relates to irrigation control as well as water and energy savings, and more particularly to methods and apparatus for use with existing controllers that are capable of implementing time of use (TOU) governmental landscape watering restrictions that override the operational schedule of such controllers.

1. Field of the Invention

In order to conserve water, the irrigation industry, state government water related agencies, and local water districts have encouraged for several years the use of smart irrigation controllers to save water. Smart controllers are referred to as controllers that can adjust their irrigation schedule depending upon local environmental conditions such as temperature, relative humidity, solar radiation, and wind. These irrigation related measures have been taken because western states frequently experience drought conditions, making water supplies critical. Residential landscape irrigation accounts for 50% to 70% of all residential water use in California, Nevada, and Arizona. Current attempts to generate public education and interest for water conservation using "smart" irrigation controllers and modules that adjust themselves to accommodate for varying environmental conditions throughout the year have not proven effective. While theoretically irrigation efficient, they have not solved the problem of conserving water due to their extremely low voluntary user and installer participation.

For example, the Los Angeles Metropolitan Water District (MWD) and its associated water districts provide water to 3.5 million residential and commercial customers in Southern California. To promote water conservation, the MWD has been promoting the use of "smart" irrigation controllers that adjust themselves to changing daily weather conditions, since customers generally fail or forget to adjust their non-smart irrigation controllers on their own. MWD's associated water districts have either provided a variety of smart controllers from well-known manufacturers either free of charge, or rebated up to 100%. The MWD reports that after 3 years of their smart controller rebate programs, less than 10,000 customers of the 3.5 million have tried to use these smart controllers. Of these, it is estimated that no more than 50% are properly used in their smart mode. This translates to far less than 1% effective usage, which would produce minimal water conservation. Another large water district, the Southern Nevada Water Authority (SNWA—which, includes Las Vegas, Nev.), reports that in over two years, fewer than 100 controllers have been rebated in an area encompassing about 500,000 addresses. Other water districts report similarly poor response to smart controller programs. Some reasons for these mediocre results are set forth below:

1. Programming ET-based (ET=evapotranspiration) smart controllers can be complex. In addition to conventional programming that requires entry of watering days, start times and watering durations, ET-based controllers require entries of precipitation rates, crop coefficient factors, soil type, slope, percentage of shade, and/or other information which is not readily available to homeowners.
2. ET-based systems, which account for many smart controllers, require either an adjacent weather station, or the transmission of weather data from which ET is calculated or ET itself. The cost of a weather station is typically several times that of the controller. The ET data transmitted to smart controllers (if weather stations are not used) requires monthly service fees that can easily exceed the cost of the water saved.
3. Landscape maintenance contractors are reluctant to install such systems due to the numerous call backs to reprogram or re-explain smart controller programming to their customers.
4. Landscape contractors and landscape maintenance firms hesitate to train their personnel to learn to program as many as 20 different controllers in order for them to explain it to their residential and commercial customers. The high turnover rate of personnel makes it non-cost effective to train their installers.
5. The reluctance for a homeowner to trust tens of thousands of dollars of their landscaping to a controller they do not understand or cannot program.
6. Many ET-based controllers are not compatible with local watering schedules. ET-based controllers accumulate the daily ET value until some threshold is reached and then permit irrigation. The irrigation day determined by the ET-based controller may not be an allowed watering day.
7. Homeowners are used to seeing their controllers start cycles at certain times of the day on certain days of the week. Not observing irrigation causes them to wonder if their system is working.
8. California bill 1881 has postponed the enforcement of its mandatory smart controller requirements to January 2012, removing the urgency to convert to smart controllers.
9. Low cost of water in many areas due to government subsidies.
10. Lax or inadequate enforcement of water rules.

In recent years, "smart" controllers (that adjust themselves to changing daily weather conditions) have been promoted for landscape water conservation. Different approaches to "smart" irrigation control are disclosed in this inventor's patents and publications (U.S. Pat. Nos. 7,058,478 and 7,266,428 and 2007/0293990); and a wide variety of ET-based patents such as Hopkins U.S. Pat. No. 5,097,861; Marian U.S. Pat. No. 5,208,855; Oliver U.S. Pat. No. 5,870,302; Sieminski U.S. Pat. No. 6,823,239; Addink U.S. Pat. No. 6,892,114; Addink U.S. Pat. No. 6,895,987, and Mecham U.S. Pat. No. 6,314,340, among others. The latter group of smart controllers utilize ET methods which calculate the theoretical amount of water required to properly irrigate various types of landscapes with varying sprinkler precipitation rates and soil conditions. ET has been studied for 50 years and as many as twenty equations have been developed to calculate ET, which is then converted to minutes of watering duration.

Smart water theory as represented by the numerous ET equations is not necessarily accurate. It is therefore possible that more water can be wasted using ET-based controllers because they are more difficult to understand and program than conventional (non-smart) controllers, particularly if the wrong ET equation is used. Highlighting this possibility, Catteano and Upham conducted a study ("Methods to Calculate Evapotranspiration: Differences and Choices") that showed that four of these recognized ET equations varied as much as 70% from each other at certain times of the year. Thus, not only is ET theory difficult to understand and not practical to use, as noted above, the various ET equations do not agree with each other.

In addition to the shortcomings of ET-based smart controllers, and the general non-agreement between ET equations, the hydraulic parameters upon which ET controllers depend to convert the inches of ET to station run times are not exact either. Entry of the precipitation rate required to calculate the watering duration from an ET value assumes a first time observation and measurement of that precipitation rate, or use of the manufacturers estimated data. The precipitation rate for a specific sprinkler is based upon the system operating pressure, proper operation of the sprinkler, and the operating efficiency of the valve. Every one of these parameters may vary daily. Furthermore, additional construction of homes in developing areas will cause changes in operating water pressure, water supply, pumping capability, and delivery. The efficiency of pumping systems also varies because of the age and maintenance of the pumps. For all of the above reasons, smart ET-based technology is not an exact science, and no amount of theoretical calculations of ET will save real water unless the system is installed, programmed, and operating properly, including the effectiveness of the infrastructure. Fifty years of research has not given us an answer as to which ET method is accurate. Even the modified Pennman-Montieth ET equation (see patent U.S. Pat. No. 7,266,428), generally accepted by most agencies, is considered to over water by at least 20%. A high level of usage of ET or smart systems, in theory could help conserve water, but does little to address energy, pumping and delivery issues.

Separate from the need for water conservation, to address infrastructure shortcomings such as pumping, water delivery, and operating water pressure, some communities have limited the hours and days of allowable irrigation by specifying, for example, even or odd street address watering schedules, watering groups, times during the day when watering is prohibited, limiting watering to even or odd calendar days, or certain interval(s) of days, etc. In most instances, after an initial education period, these methods have proven to be easier to adhere to and more effective in water conservation than smart controllers. The problem with this voluntary approach is that it still requires the homeowner or landscape contractor responsible for the maintenance of commercial sites to return to each site a number of times a year to manually reprogram each controller, in addition to their normal maintenance responsibilities. The SNWA estimates that near full compliance to their mandated watering schedules (without any smart controller usage) would save at least 10% of the entire annual water needs (residential, commercial and industrial) in Clark County Nevada, which includes Las Vegas. This is important because the cost of upgrading the infrastructure or importing water from the Northern-Sierra Nevada could run into the billions of dollars.

Based upon a study sponsored by the Irrigation Association, most irrigation users are not willing to or are incapable of changing their schedules as required during the course of the year. It is therefore desirable to provide inexpensive, easily installable, easily programmable, automated, non-smart, add-on irrigation control methods and apparatus that operate independent of environmental conditions, system hydraulics, or controller size or model that automate implementation of governmentally established watering restrictions. This approach has the potential to save hundreds of times more real water than any existing smart controller.

In addition, in locations with rapidly increasing population, the device would alleviate the pumping and delivery problems of the available water thereby also saving energy pumping costs. Energy and water are two resources that are critical to any community that need to be conserved and managed. Energy conservation has been promoted by electric utilities in many communities for years in the following ways:

1. In California in the 1990's, Pacific Gas and Electric and Southern California Edison offered programs to agricultural customers that significantly reduced their electric rates if they abstained from using their irrigation pumps during certain times of the day.
2. Electric utility companies offered rate incentives for residences that reduced their power usage during peak times of the day, particularly in the summer. It was less expensive to offer power credits or reduced rates than to build new power plants and lines.
3. These power utility companies also had "rolling brownouts" that selectively turned off parts of cities to save energy during heat waves that exceeded the power grid demand capabilities of power generation and delivery.
4. Today, certain electric companies are proposing to control thermostats during certain times of the day to help conserve energy. This would be presumably accomplished with the installation of a wireless device that can control either the heater/air conditioner, or the temperature setting itself.

All of the above attempts are exclusively related to energy conservation during certain times of the day. It would therefore be desirable to conserve both water and energy by reducing the use of additional pumps or larger horsepower pumps by providing an inexpensive, easily installable, easily programmable, non-smart, automated, add-on irrigation control methods and apparatus to automate implementation of governmentally established watering restrictions.

2. Description of the Prior Art

A number of modules or add-on devices are available which attach to existing conventional controllers to make them smart and theoretically save water. Among them is the invention disclosed in U.S. Pat. No. 6,892,114. This patent discloses monitoring of the inrush and holding currents output from the controller in order to "learn" the initial programmed station run times. After calculating desired run times from supplied environmental parameters, the controller outputs are cut off at the new calculated time. The cut offs fluctuate from day to day depending on the environmental parameters and the calculations. In another embodiment, ET values are accumulated until a minimum threshold value is reached before irrigation occurs. In U.S. Pat. No. 6,895,987, an irrigation scheduler automatically modifies irrigation schedules of installed irrigation controllers to affect irrigating of the landscape based on the water requirements of the landscape plants, and calculates a daily ET value which is then used to control the output of the controller. Publication No. 2004/0039489 describes wireless transmission of various environmental data such as temperature, humidity, solar radiation, wind, and rainfall to calculate an ET value in a module attached to the output of an irrigation controller which then modifies its schedule. This design is manufactured by Weather Reach and commercially marketed by Rain Bird.

The August 2007 edition of Weather and Soil Moisture Based Landscape Irrigation Scheduling Devices (published by the U.S. Dept. of the Interior, Bureau of Reclamation) describes a number of currently manufactured "smart" irrigation control devices, including: a weather station by Hunter Industries which provides environmental data to a module attached to their controllers which calculates a daily ET and provides it to the controller which then determines if, when, and how much to irrigate; add-on modules made by Water2Save, Micromet, and Eco Research which are dependent upon environmental or ET-based data to govern various controller outputs or irrigation schedules. Ground moisture sensors as add-on devices are also disclosed in the Bureau of Reclamation publication such as those provided by Irrometer, Acclima, Dynamax, Lawn Logic, and Watermonics. These devices measure soil moisture to determine the need for irrigation.

It is apparent from the foregoing that a number of "smart" add-on modules are currently available that are designed to manage the outputs of irrigation controllers based on changing environmental conditions. However, all of these inventions are dependent upon environmental factors or ground moisture to calculate or determine the time, duration, or frequency of irrigation cycles. In contrast, the present invention does not use real time environmental data, any additional equipment such as weather stations, stored historical weather data, transmitted or calculated weather data, or any form of ET to control an irrigation controller's output(s), nor does it monitor the outputs of existing controllers, or adjust the irrigation schedule based upon the landscape vegetation plant needs.

SUMMARY OF THE INVENTION

The present invention provides simple automated methods and apparatus for water conservation and energy savings that balance the infrastructure demands for water delivery by facilitating easy compliance with a community's watering regulations and restrictions as imposed by local governmental authorities. The present invention saves water and energy, improves irrigation efficiency, and saves the cost of infrastructure upgrading using simple methods and apparatus that have heretofore not been contemplated with any existing technology.

In one of its preferred embodiments, a programmable module is provided that is easily attached to any existing irrigation controller. The existing controller may be powered by batteries, AC, DC, solar, or ambient light, and it may be a conventional or smart controller. The irrigation system may also be a central system where a central unit or computer directs the slave controllers in the local community when to irrigate. The module of the present invention may be powered by any suitable source including without limitation batteries, AC, DC, solar, ambient light, etc. A microprocessor incorporated within the module keeps the current time of day, calendar, and contains a specific watering schedule(s) determined by a local governmental authority. In some embodiments, the device is installed in series on the common electrical line between the controller and its valves, and is capable of breaking that line to prevent the valve solenoids from activating, thereby only allowing watering during the designated days or hours, depending upon the requirements imposed by the local governmental authority. These requirements may allow watering at different times depending upon such things as the address or location where the module is installed, the season, the date and/or the time of day. In these embodiments, only two wires need to be attached to any existing controller.

In some embodiments, the module may be pre-programmed with one or more different pre-determined watering restrictions as established by a local governmental authority. For example, a local municipality may have watering restrictions as follows: during designated summer months, watering of even-numbered addresses is allowed on certain days and odd-numbered addresses allowed on different days, but no watering is allowed at any address during certain daylight hours; during non-summer months different watering days and times are allowed. An embodiment of a module of the present invention may have four sets of pre-programming, and a switch, button or other means on the module to select one of them: (1) summer-odd, (2) summer-even, (3) winter-odd, and (4) winter-even. Depending on the address where the module is used (even or odd) and the season of the year (summer or winter), the user can easily set the module so that it follows the correct watering schedule for that particular time and location. It is to be understood that embodiments of the present invention encompass the capability to have pre-programming for additional restrictions depending upon the regulations of the local governmental authority.

More sophisticated embodiments may include an internal clock that is set to the correct date and time in order to automatically switch between pre-programmed summer, fall, winter, spring or other watering schedules. Such embodiments may not include any switches or switch settings, or they may include simple switches or settings such as "even-odd" to designate the address of the location. In other embodiments, separate modules may be provided without switches, for example one containing pre-programming for use with even-numbered addresses, and another containing pre-programming for use with odd numbered addresses. In other embodiments, additional programming and/or separate modules may also be provided for commercial as opposed to residential use, if different restrictions are imposed for commercial and residential properties by the local governmental authority. It is to be appreciated that multiple modules, or multiple switches, switch settings, buttons, or the like may be provided with modules of the present invention, to provide a selection of pre-programming options, and that a wide variety of different combinations of switch-selectable options may be implemented on different modules with or without an internal clock.

In other embodiments, the modules of the present invention may be provided with an input for receiving updated programming. In some embodiments, such input may be in the form of a connector (e.g., USB, Ethernet, telephone jack, etc.) to which a cable is attached to download programming from an external source such as a USB flash drive (memory stick), computer or the Internet. This allows the programming in the module to be updated in the event of changes by the local governmental authority. In other embodiments, the module may include a reader that may receive a card, strip or other article having a magnetic strip or other means for holding data/programming that may be read and implemented by the module. These embodiments allow the local governmental authority to provide updates by simply mailing out cards, strips, or other convenient data transfer devices, by making programming updates available on line through the Internet, or by having a technician drop by to download the programming from a portable device.

In other embodiments, the module may be provided with a receiver that is capable of receiving a wireless transmission from another source to provide programming. The transmission may include initial programming from the local governmental authority, updated programming (e.g., for the current season), or emergency programming in the event the local governmental authority imposes unexpected restrictions (such as in the case of a worsening drought). The programming may be broadcast from a single central source, or from multiple sources, or technicians may travel through neighborhoods with transmitters to broadcast updated programming to locally affected areas.

In other embodiments, the module of the present invention may be attached to a master valve at a location to hydraulically disable the water supply at that location.

In other embodiments, the watering schedules of the local governmental authority may be incorporated within a new controller, (conventional or smart) without the need for an external module to override the controller's programmed watering schedules.

In preferred embodiments of the invention, it is self-(battery) powered in order to be surge proof and electrically safe.

It is therefore an object of the present invention to provide methods and apparatus for implementing time of use regulations from local governmental water authorities within their territories.

It is also an object of the present invention to provide methods and apparatus for easily implementing changes or updates to time of use regulations from local governmental water authorities within their territories.

It is also an object of the present invention to provide simple and effective methods and apparatus for water and energy conservation.

It is also an object of the present invention to provide simple, low cost, and effective methods and apparatus to alleviate significant infrastructure upgrade costs (pumping systems, water delivery systems, sewage treatment plants, etc.) by balancing water demands within communities.

It is also an object of the present invention to provide methods and apparatus that are simple enough that virtually any end user can afford, install, and/or program the invention without the need for an electrician or other professional. In many instances, the device may be provided free of charge by the local water agency. A very cost effective module that is simple to install and program, provided free of charge, that reduces, simplifies or eliminates user reprogramming and contractor call backs with no monthly service fee, greatly improves the likelihood of high compliance that will save significant money in terms of water, energy, and infrastructure upgrading.

It is also an object of the present invention to provide an add-on module or controller that may be used with virtually any irrigation system anywhere in the world to implement time of use regulations from local governmental water authorities with only slight software modifications specific to a region or country.

It is also an object of the present invention to provide a built-in module for an existing controller for implementing time of use regulations from local governmental water authorities.

It is also an object of the present invention to provide an add-on module that may be used in conjunction with a master valve at a location to cut off the water supply at that location.

Additional objects of the invention will be apparent from the detailed descriptions and the claims herein.

BRIEF DESCRIPTION OF THE DRAWINGS

FIG. 2 illustrates sample SNWA watering schedules.

FIG. 3 illustrates an exemplary display for an embodiment of the present invention having an SNWA watering schedule.

FIG. 10B illustrates an embodiment of the present invention having an input connector for attachment to a cable from a source such as a personal computer.

DETAILED DESCRIPTION

Figure 1:
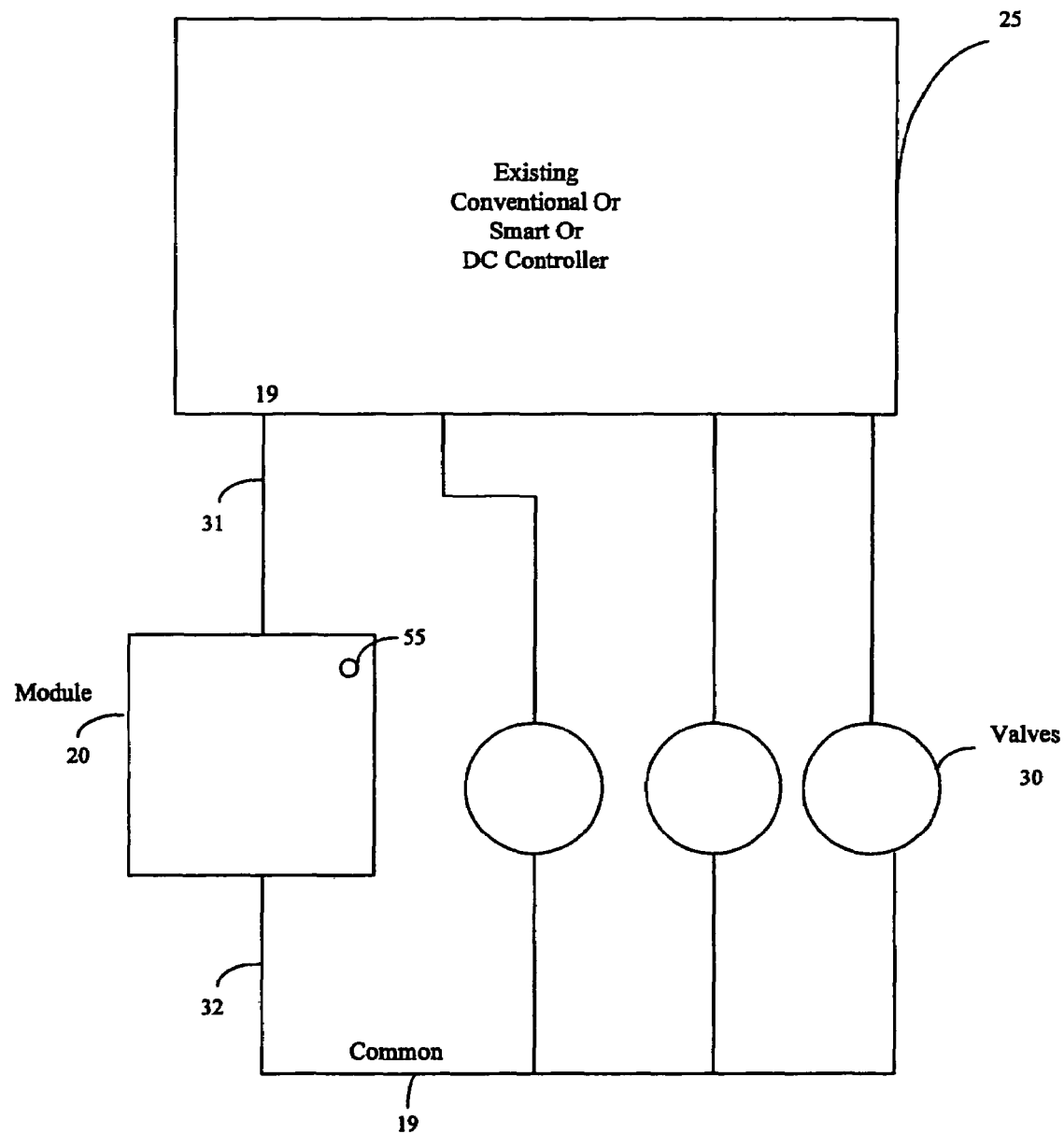
FIG. 1 is a block diagram of an embodiment of an add-on module of the present invention.
Figure 4:
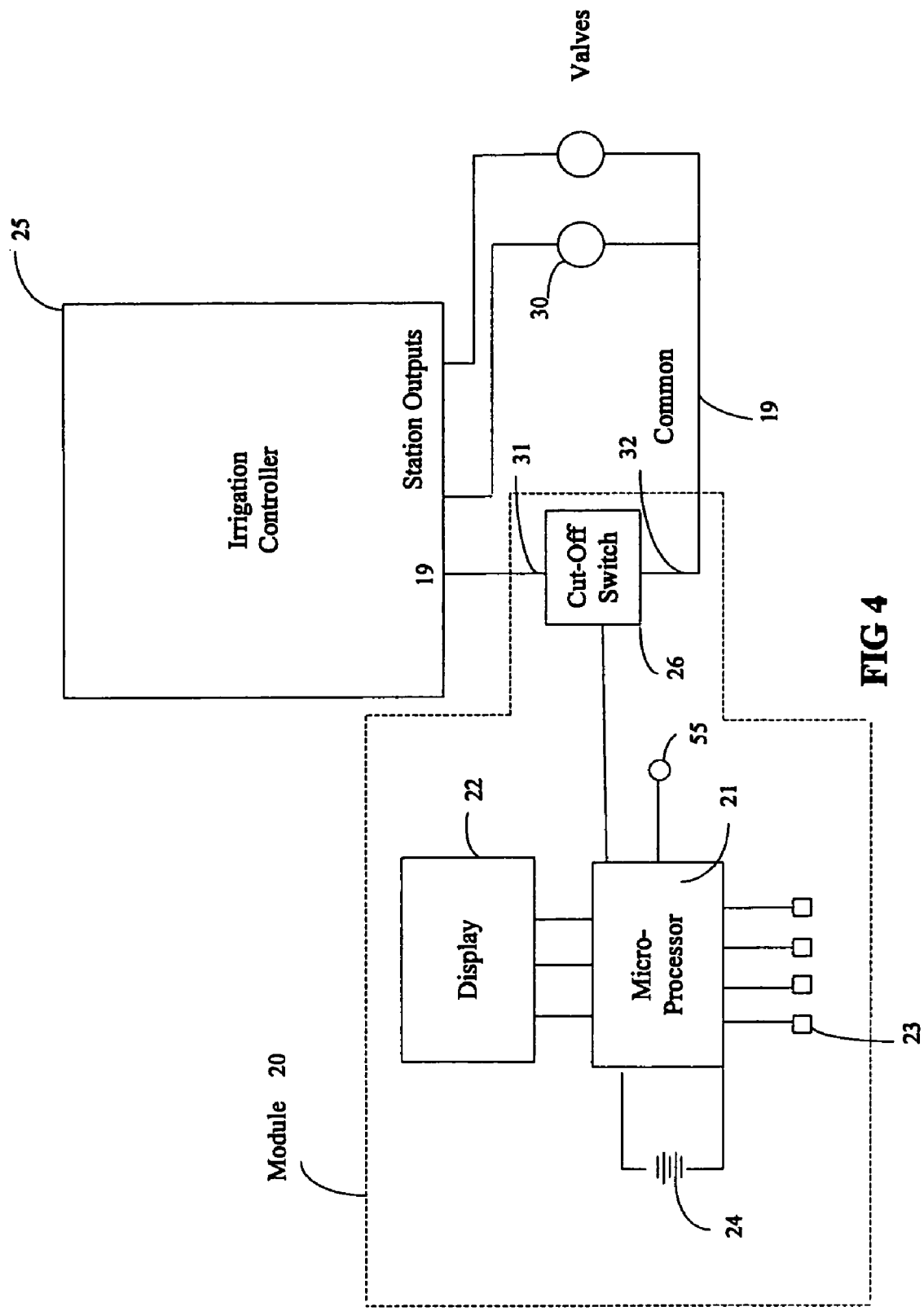
FIG. 4 is a block diagram of an embodiment of the invention powered by an internal battery.

Referring to the drawings wherein like reference characters designate like or corresponding parts throughout the several views, and referring particularly to the illustrated embodiment of FIGS. 1 and 4, it is seen that this embodiment of the invention comprises an electronic module 20 that may be connected to the output common 19 of an existing controller 25. The embodiment of module 20 illustrated in FIG. 1B has a display 22, one or more data entry or programming buttons 23, and a power supply 24. It is to be appreciated that other embodiments of the invention may not include any display 22 and/or may not include any data entry devices 23. The power supply 24 may be in any suitable form, such as one or more lithium, alkaline, or rechargeable batteries, or the AC power from the controller may be used to operate the electronics of the module. A DC power supply for the module is preferred because it is electrically safe and isolated from primary and secondary surges.

In a preferred embodiment, two non-polarized wires or connections 31, 32 are provided for installation along the common output line 19 between the controller 25 and its valves 30. (See FIG. 1.). A module 20 of the present invention may be programmed with the time of day and calendar date, which may be pre-programmed before installation, or input after installation. In some embodiments, the water group (e.g. even/odd address, commercial/residential) may also be pre-programmed, or it may be input after installation. Embodiments where the date, time and water group are pre-programmed may not require data input buttons. A bypass function 55 may be provided that allows for overriding the output from the module for maintenance purposes or during periods of seeding and germination that require frequent daily short duration watering. In normal operation, a controller 25 may be programmed with its summer irrigation schedule which may call for every day watering. Controller common output 19 is attached to a module input line 31 which goes to a cutoff switch 26 inside the module. Depending upon the local watering schedules, the cutoff switch 26 inside module 20 breaks the controller output electric common 19 which is attached to the input 31 to the module to the valves 30, disabling their operation according to the restrictions of the local governmental water schedule programmed into the module 20. In alternative embodiments, the valve cutoff that is disabled by module 20 may be a mechanical device such as a relay, or an electronic device such as a triac.

Figure 1A:
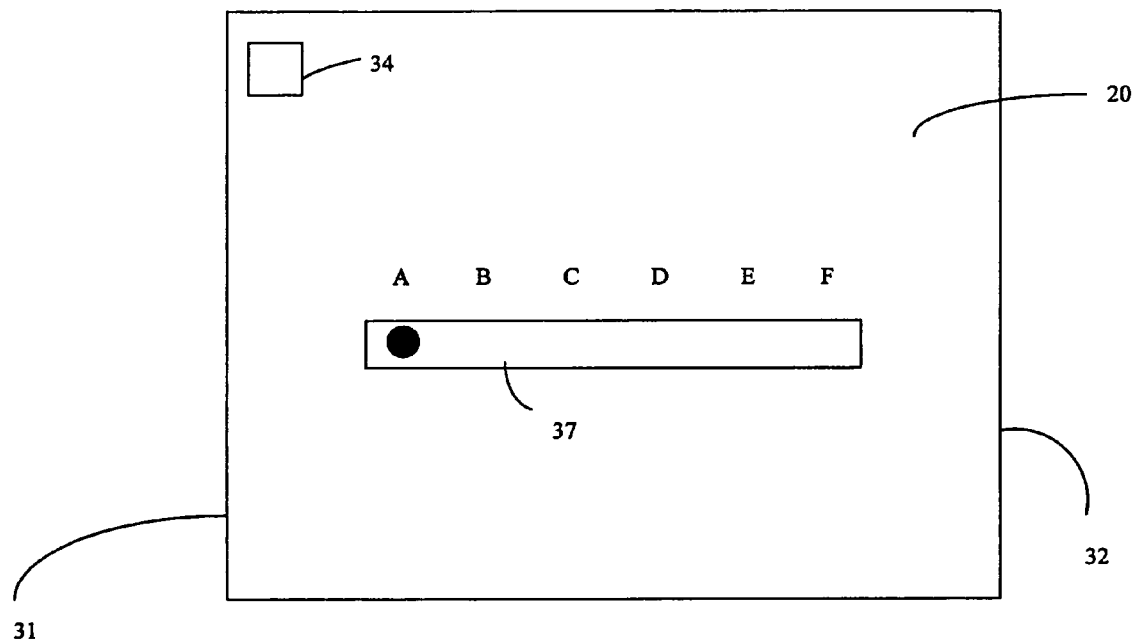
FIG. 1A illustrates an alternative embodiment of an add-on module of the present invention.

FIG. 1A shows a multi-position slide selection of a watering group as a means of programming the module.

Figure 1B:
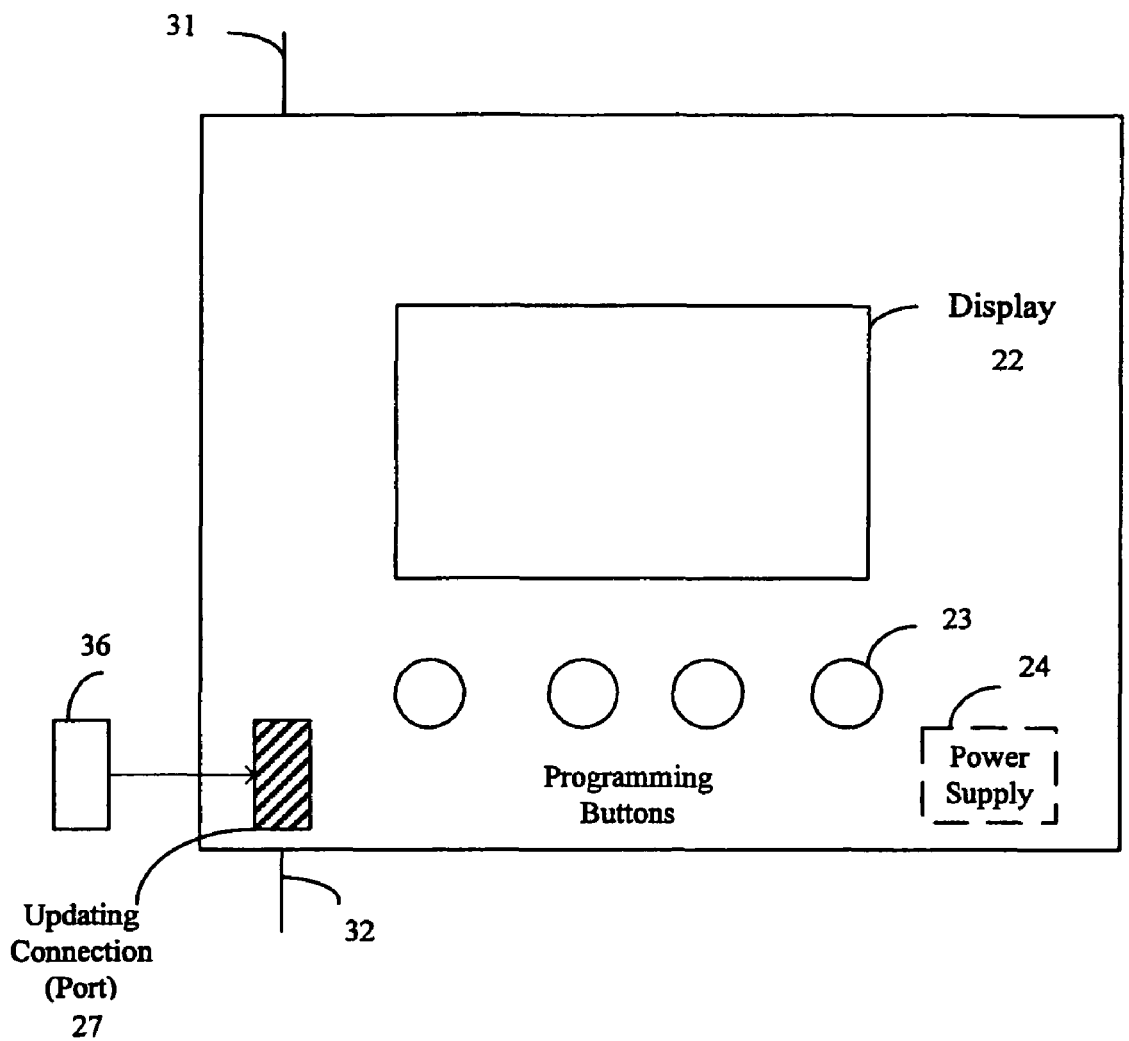
FIG. 1B illustrates an alternative embodiment of an add-on module of the present invention.

FIG. 1B shows programming buttons and a display as a means of programming the module.

Figure 1C:
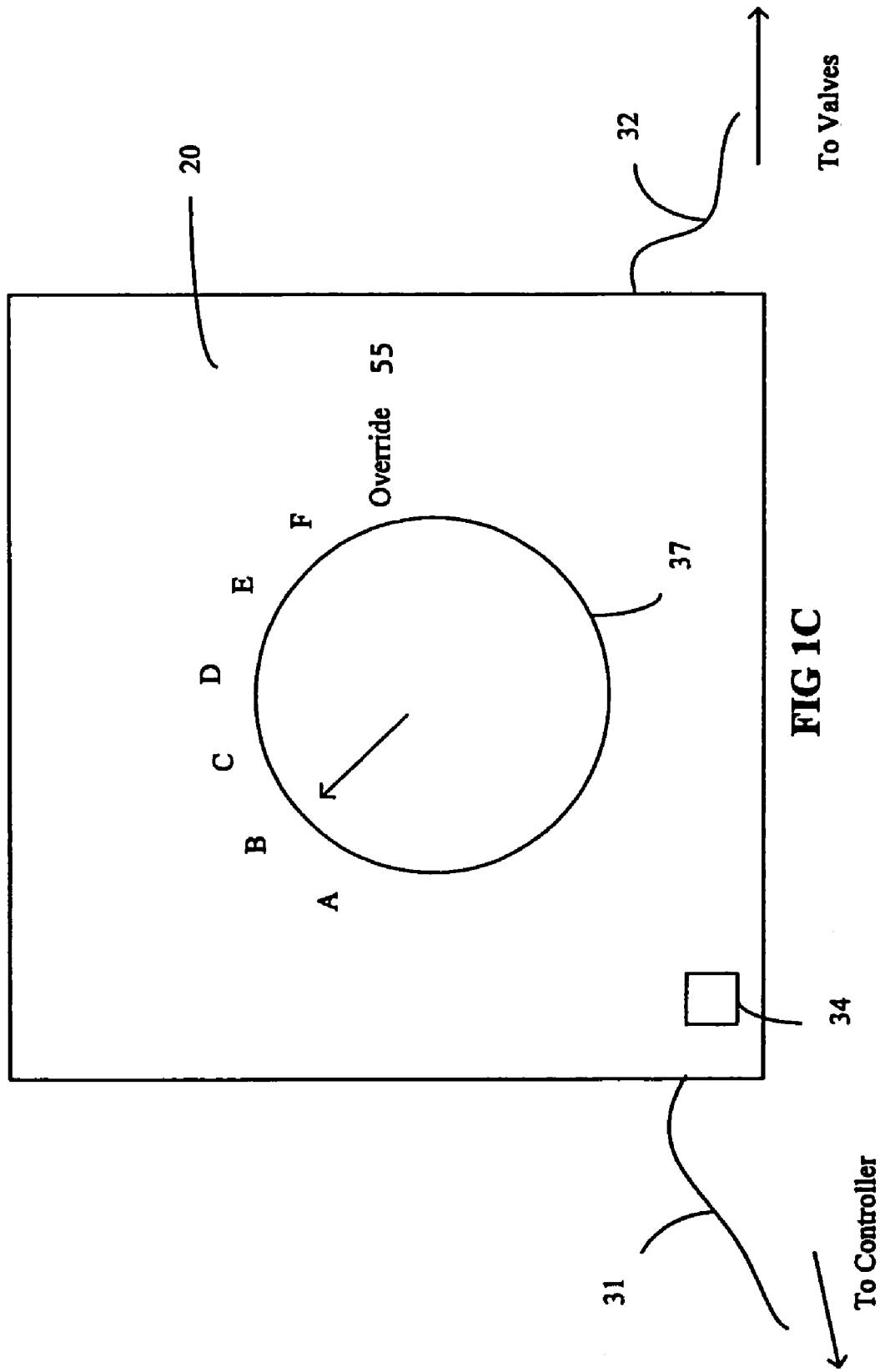
FIG. 1C illustrates an alternative embodiment of an add-on module of the present invention.

FIG. 1C shows an exemplary rotary switch 37 with one or more selections for watering group designations, and an override capability 55 as an alternate embodiment. Rotating the switch 37 selects a pre-programmed watering schedule. One of the programming positions can be used for an override or bypass. In alternative embodiments, a rotary switch with more positions than currently needed may be provided to allow for future addition of watering schedules or groups.

FIG. 2 shows the Southern Nevada Water Authority "Drought Watering Restrictions." The SNWA has assigned areas of Clark County with six different watering groups with their respective watering schedules. For example, during the summer, all groups (A-F) can water any or all days. In a separate limitation (not shown), it prohibits watering from 11 a.m. to 7 p.m. during the summer months. In the spring and fall, watering days are either Mondays-Wednesdays-Fridays or Tuesday-Thursday-Saturdays depending on the watering group designation. During the winter, only one day per week of irrigation is allowed, that day depending on the group. However, during winter watering is permitted during any time of day.

FIG. 3 shows an example of how a display might look for an embodiment of the invention adapted for use with the SNWA schedule. In this example, it is 1:30 p.m. on Jul. 7, 2006 and the screen shows that the module output is "Off" because even though it is during the summer schedule, it is off because the time of day is between 11 a.m. and 7 p.m. In this figure, the permitted watering days are shown along the bottom of the display as Su, Mo, etc. Because this shows an exemplary display during summer, all the days of the week are shown.

FIG. 4 is a block diagram of an embodiment of a time of use module of the present invention attached to an irrigation controller 25 that may be smart or conventional. The illustrated components in this exemplary embodiment of a module 20 are the display 22, microprocessor 21, power supply 24, input switches 23, and output cutoff switch 26. A common wire 31 from the module attaches to the controller common output 19. The wire 32 out of the module 20 attaches to the common of the valves 30. The power supply 24 for the module 20 can be from any suitable source, including without limitation, AC supplied from the controller, an internal battery, either permanent such as a lithium battery, or replaceable standard alkaline batteries, etc. This embodiment is shown with an internal battery 24. In a typical application, module 20 is programmed by means of input switches 23 with the time and date. The assigned watering group (even or odd street addresses, watering group, etc.) is programmed into the module either by means of the input switches 23, an internal dip switch, a rotary switch 37, or the like, that sets the assigned watering group. The module's cutoff switch 26 is either open or closed. A closed cutoff switch allows an irrigation cycle to take place if it is an allowed watering day or time of day. If it is not an allowed watering day, the cutoff switch is open. This cutoff switch 26 may be a mechanical device such as a relay, or a solid state device such as a triac. If it is a non allowed watering time or day, the controller output is cut off and the valves 30 do not receive the needed 24 volts AC voltage to operate. Input 55 to the microprocessor provides an override (bypass) either from an external override button, or from the rotary switch position as shown in FIG. 1C. The controller in FIG. 4 has one or more station outputs connected to each valve, while a single common typically connects all the valves.

Figure 5:
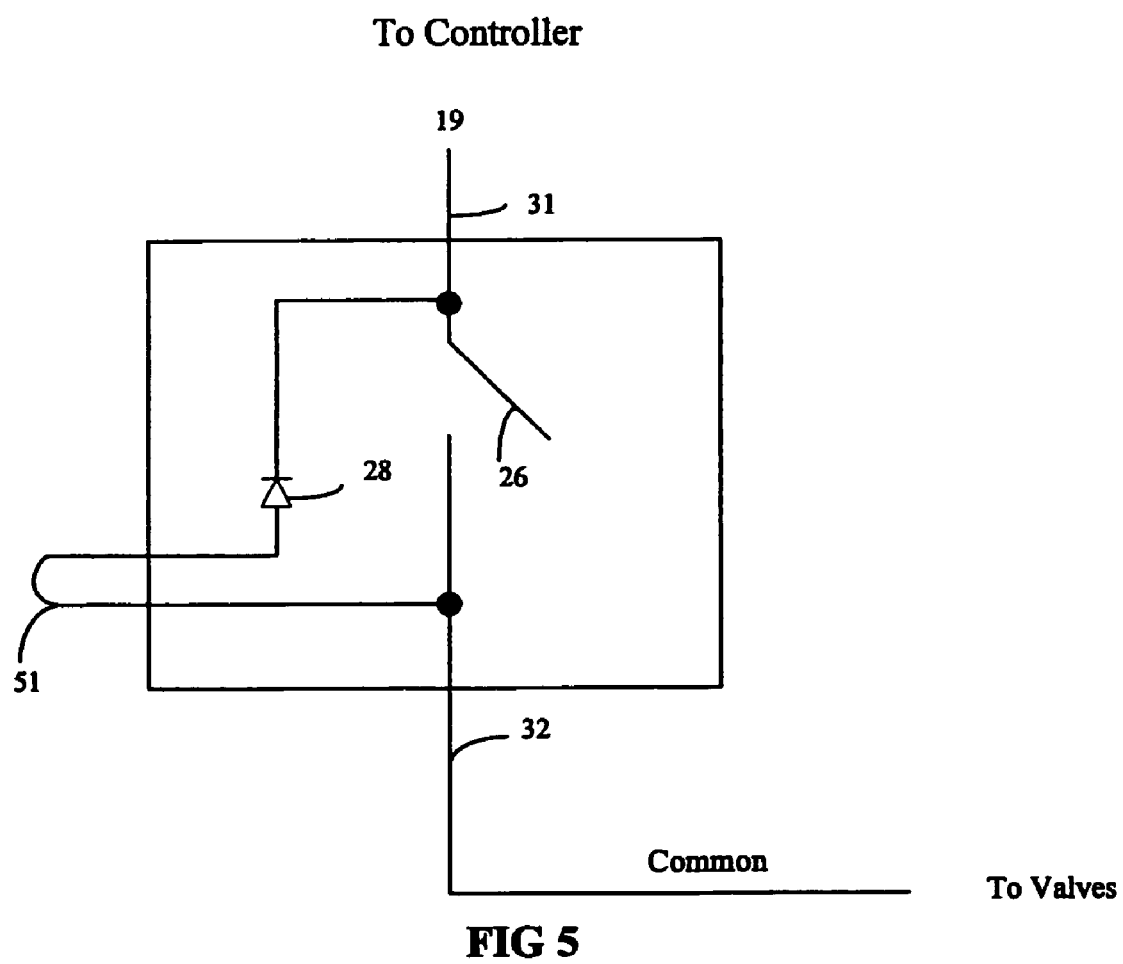
FIG. 5 illustrates an exemplary embodiment of a switching means of the present invention modified to work with a battery powered irrigation controller.

FIG. 5 shows an embodiment of a cutoff switch of a module 20 designed to operate either with an AC powered controller or a battery powered controller. An internal diode 28 in parallel with the cutoff switch 26 allows operation of the module with a battery powered controller. Battery powered controllers operate latching solenoids that are typically pulsed with a positive voltage to set (or latch) and a negative pulse to release. When the module indicates this is not an irrigation day or time for that watering group, the diode 28 allows a valve 30 to receive a negative pulse from the controller 25 to close the valve, but blocks positive pulses from the controller to open a valve, effecting compliance with the mandatory watering restrictions. When used with an AC controller, the jumper wire 51 (a loop external to the module) is cut off (severed) so that the diode 28 is taken out of the circuit; then, open switch 26 does not allow any valve to operate as described previously with reference to FIG. 4.

Figure 6:
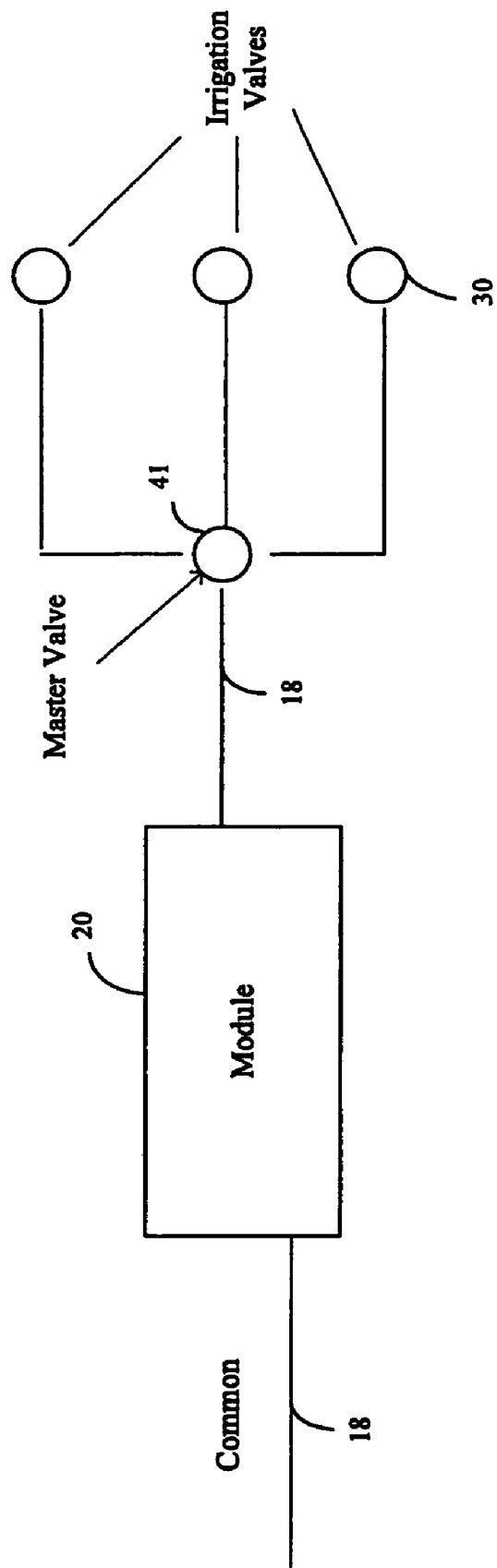
FIG. 6 illustrates an embodiment of a module of the present invention on an electric common line to a master valve.

FIG. 6 shows an embodiment of a module 20 of the present invention, for either an AC or a DC system, mounted at a master valve 41 to break the common electrical line 18 operating the master valve. Disabling the master valve 41 hydraulically cuts off irrigation by all slave valves 30 in the same hydraulic system. In many commercial applications, it may be more convenient to place a module 20 at a master valve 41 rather than at a controller for greater accessibility for maintenance purposes.

Figure 7:
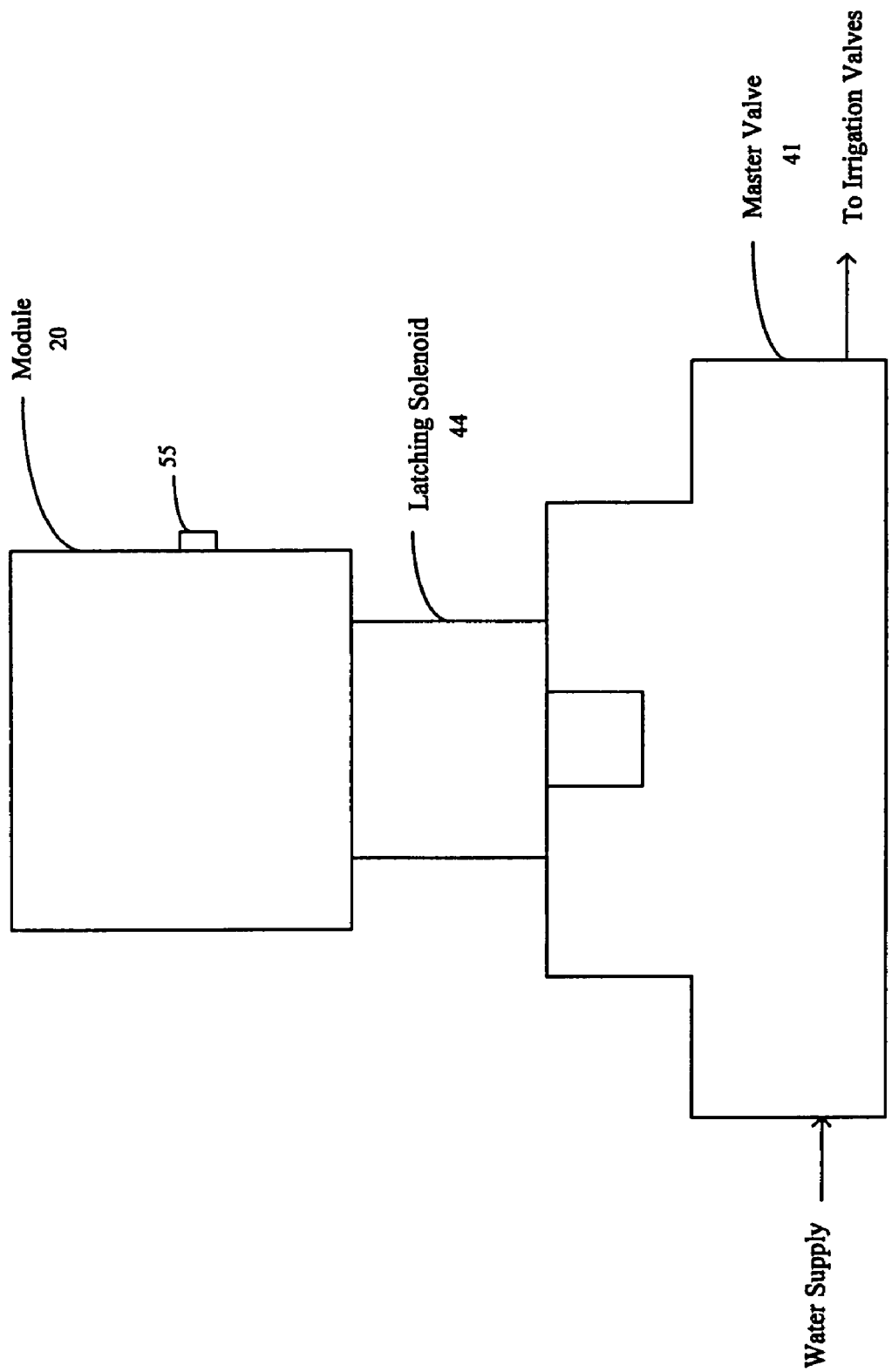
FIG. 7 illustrates an embodiment of a module of the present invention installed on a master valve that is not electrically connected to a controller, but capable of independently either allowing or inhibiting irrigation based upon pre-programmed watering restrictions.

FIG. 7 shows an embodiment of a module 20 of the present invention directly mounted on a master valve 41 with its own latching solenoid 44 powered by the module which can shut off the master valve independent of an irrigation controller. In this case, the master valve 41 is not electrically attached to a controller 25. The programming in module 20 determines when master valve 41 is permitted to be open, allowing irrigation. An emergency override 55 may be provided to bypass the module 20 for repairs or maintenance. In most instances, master valves 41 are used in commercial applications.

Figure 8:
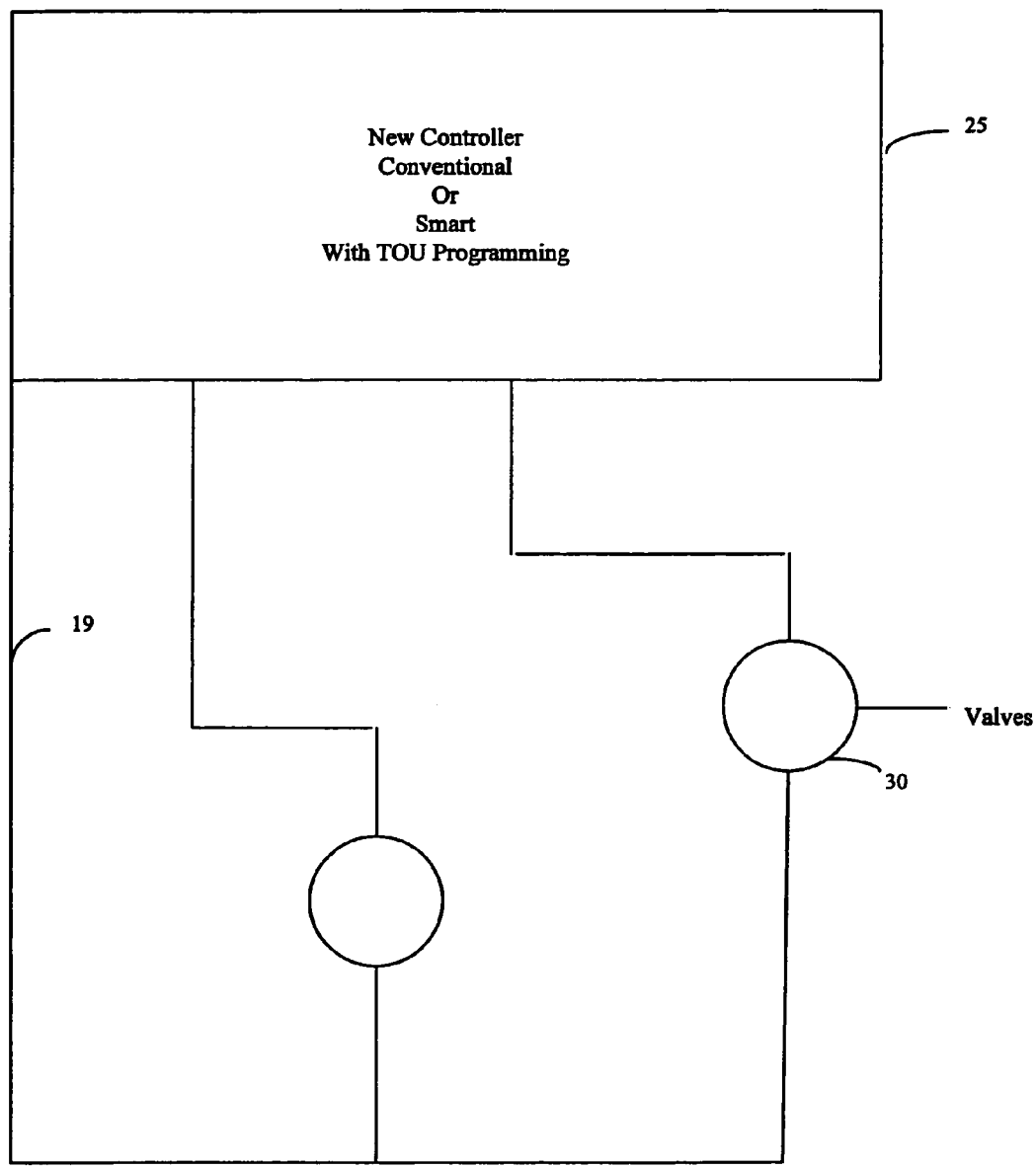
FIG. 8 illustrates an embodiment of the present invention incorporated within a conventional or smart controller without the need of an add-on module.

FIG. 8 shows an existing controller 25 (conventional or smart) in which the restricted watering schedules of the local governmental entity have been loaded into the controller 25. The watering schedules of the controller are determined in the usual fashion (by conventional or smart means), but the irrigation cycles are not allowed to run if the governmental watering schedules do not permit watering.

Figure 9:
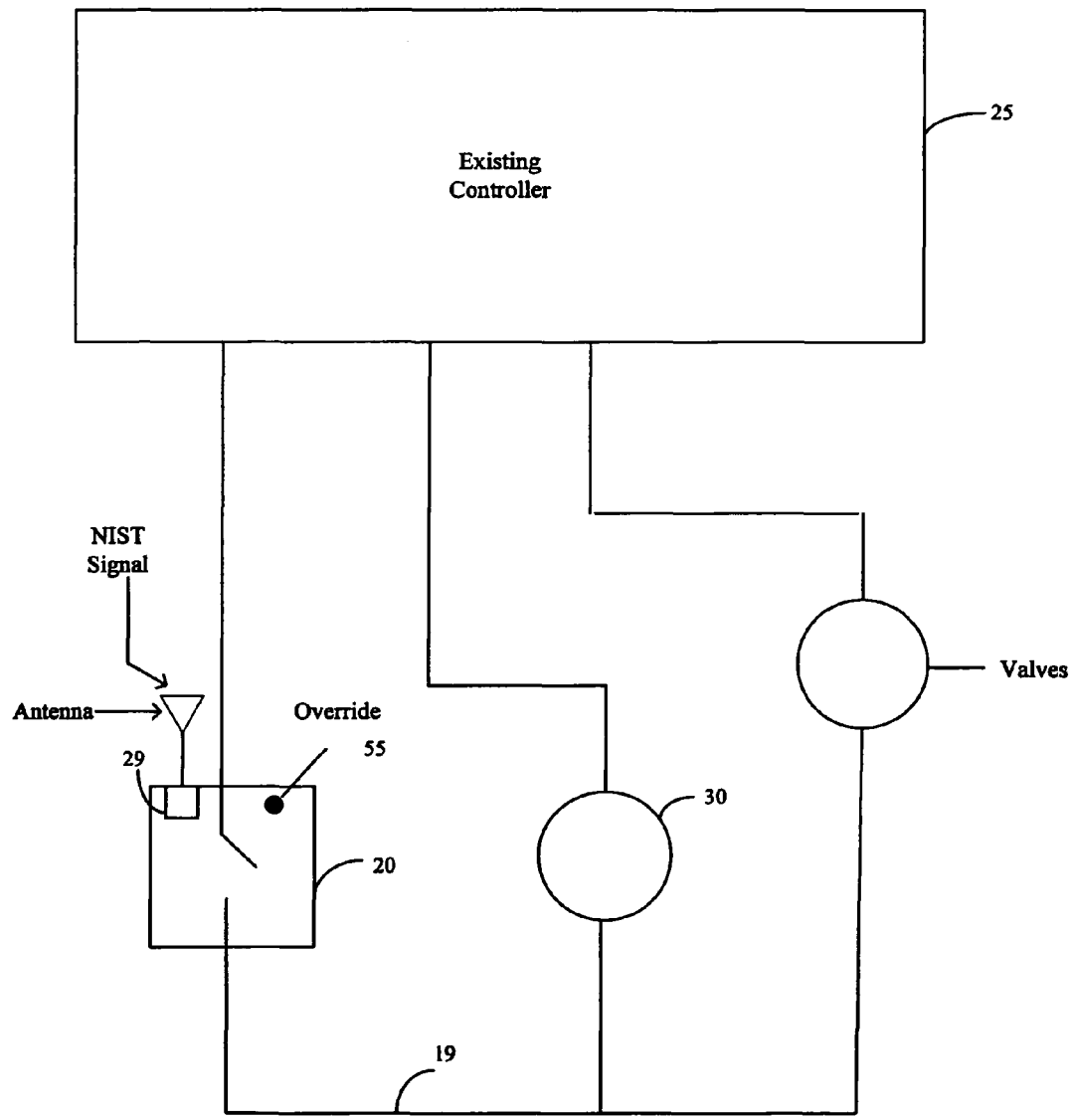
FIG. 9 illustrates an embodiment of a module of the present invention without a display or data entry means, with current time and date provided wirelessly (such as by an NIST clock signal). The illustrated exemplary embodiment has an override button and a means of indicating whether the output is "on" or "off" or in "override."

FIG. 9 shows an existing controller (conventional or smart, AC, DC, solar, ambient light powered, etc.) with an embodiment of a module of the present invention attached thereto having no display or data entry or programming buttons. A time signal such as found commonly with atomic clocks may be used to keep the time and date accurate, and the module may be pre-programmed with a specific allowed watering schedule that pre-empts irrigation by the existing controller 25. The time of day and day of the week is kept by the internal microprocessor that can keep time like a common wrist watch, and/or be updated wirelessly through a receiver 29 and antenna on module 20 by the time signal provided by WWVB which are the call letters for the NIST (National Institute of Standards and Technology) radio station that broadcasts a precise time reference signal.

Figure 10A:
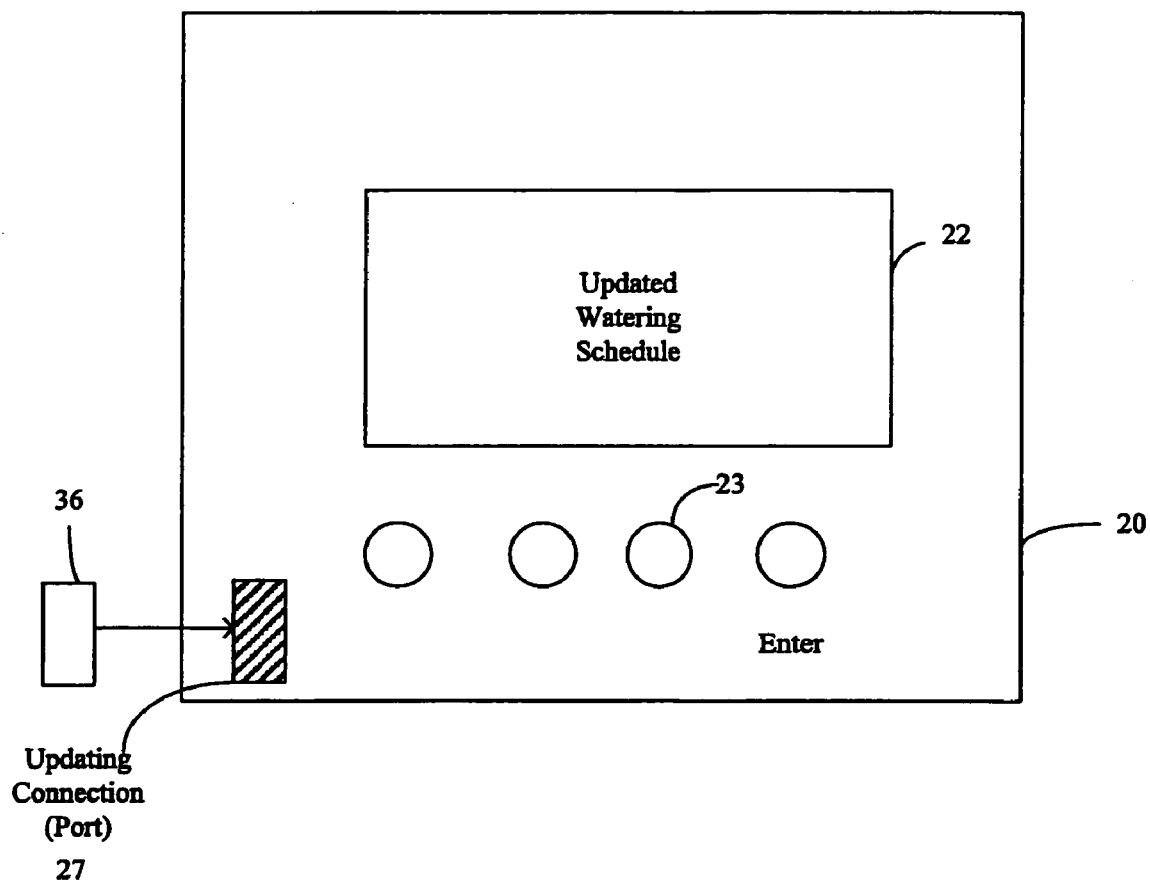
FIG. 10A illustrates an embodiment of an updating device that is shown engaged with an embodiment of the module of the present invention.

FIG. 10A shows an embodiment of a small data-transfer device 36 (such as a card, magnetic strip, USB flash-drive or memory stick, etc.) that can be plugged into or otherwise read/received by a module 20 of the present invention at data input port 27 to update or alter the existing watering schedules (TOU program). In some embodiments, the module of the present invention is pre-programmed with current local governmental watering schedules. In other embodiments, the initial programming may be provided using the data transfer device 36, and it may be changed or updated with different data on another data transfer device 36. For example, it is possible that at some future date, because of changing water supplies, worsening drought conditions, increased housing development or the like, the local governmental water authority may decide to alter the restrictions on landscape irrigation. The data transfer devices may be small enough that they may be mailed out by the local governmental water authority to users in the area subject to restrictions.

Figure 12:
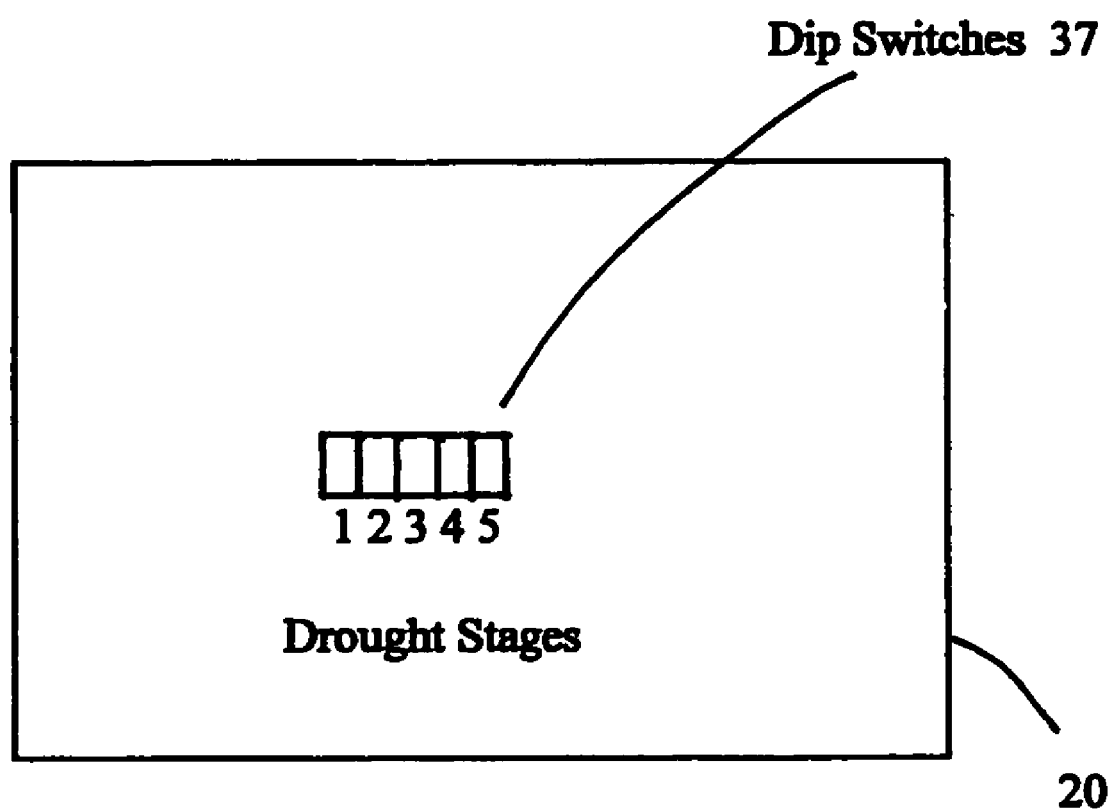
FIG. 12 shows an embodiment of a module with multiple internal drought stages programmable with an internal dip switch.

In some embodiments, the data transfer device 36 may be a small device about ½ inch square and less than 0.1 inches thick with the new watering schedules which could be supplied to the water authority which can then mail it to the customers with instructions to connect it or plug it into the module 20. Upon making an electrical connection, the module 20 recognizes that a new program is available and the microprocessor 21 automatically downloads the revised watering restrictions without the need for user programming. It is to be appreciated that multiple watering schedules may be provided in this way. As an alternative, if changing conditions are anticipated by the water authority and stricter contingency plans have been contemplated, the module 20 may already have the stricter watering restrictions pre-programmed and the user may simply access it, for example, by making a selection on a switch 37, or changing a setting (such as an internal dip switch). The stricter schedules may also be accessed by means of the front panel programming buttons or data entry switches 23, or by a selectable switch 37 (which may be rotary, slide, dip, etc.). FIG. 12 shows an exemplary embodiment having a DIP switch 37 used to select the pre-programmed drought stages. FIG. 10B shows a cable connection 39 to a PC for drought schedule upgrading.

Figure 13:
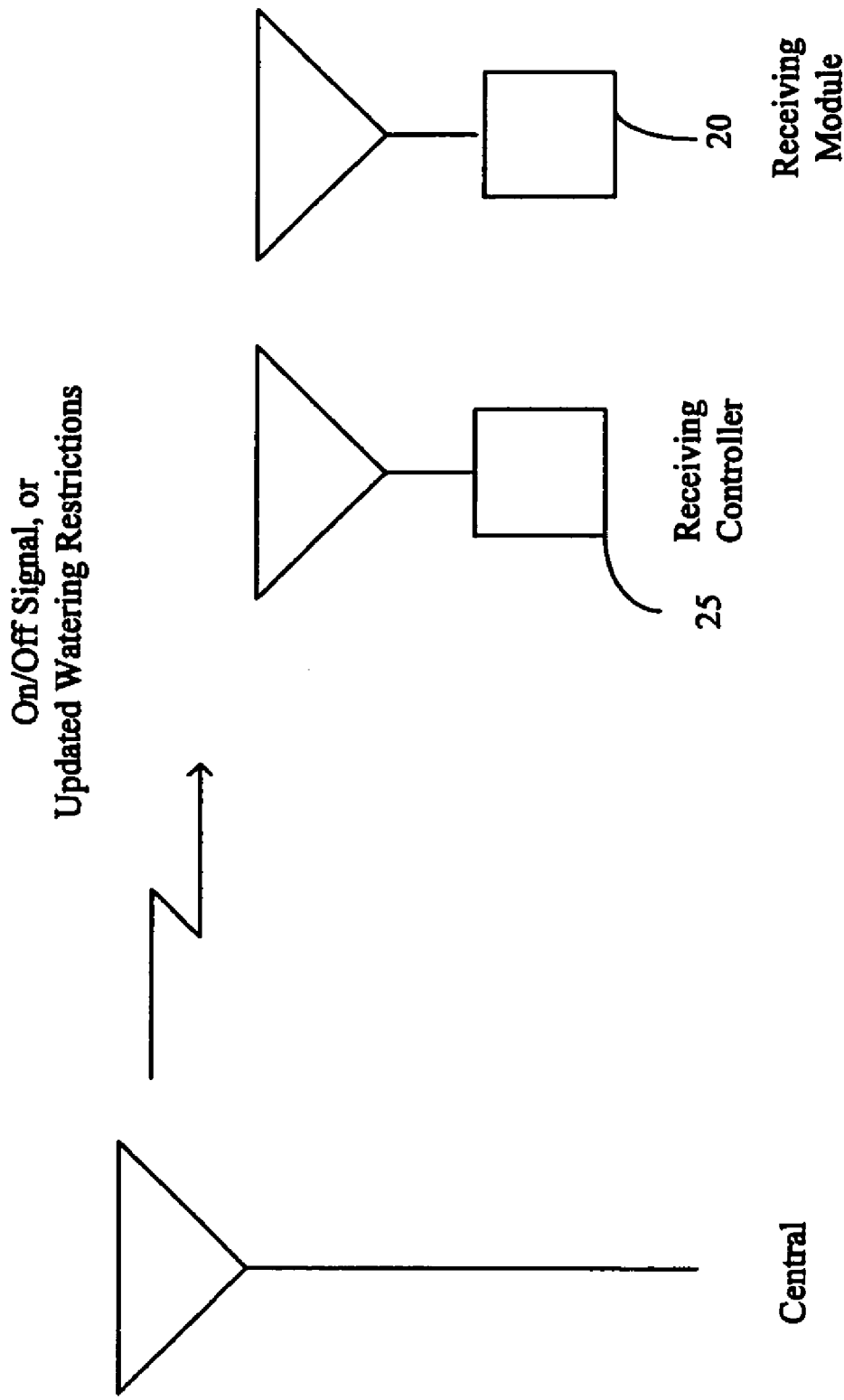
FIG. 13 is a simplified block diagram of a centrally located transmitter sending signals to embodiments of the present invention.

Other alternative embodiments of the present invention that allow for changing watering schedules provide initial or revised watering restrictions by wireless means to modules 20 that have receivers 29 monitoring for such commands. Upon receipt, the new watering restrictions are automatically enabled within the module 20. Each module 20 may have its own unique address or identifier in order that modules 20 at different locations or addresses may be addressed separately and receive different watering instructions. The module 20 in these embodiments does not require a display or date or calendar since this information may be supplied with the transmission. It is to be appreciated that the transmission may be broadcast from a single central source, from multiple sources that are strategically placed at different locations, from traveling vehicles carrying broadcasting equipment, or from hand-held broadcasting devices. As shown in FIG. 13, an exemplary central station can broadcast watering schedules to every module 20 or controller in the broadcast area. The receiving modules 20, may act as cutoff switches to their respective irrigation controllers.

In other embodiments, the data transfer device itself 36 may include a receiver 29 for receiving updated watering schedules. The data transfer device is attached or plugged into a jack 27 on the module 20, and updated watering information is transmitted to receiver 29 and provided to module 20.

In alternative embodiments such as that shown in FIG. 10B, the initial, updated and/or emergency watering restrictions may be downloaded from the Internet, a computer (PC), or from some other source. In these situations, cable 39 is inserted into a connector or jack 27 on the module 20 through which water restriction programming is downloaded from an external source (Internet, hand held unit, computer, etc.) into the microprocessor 21 of the module. In emergency situations, the local water authority may provide an Internet address from which a user may download updated programming to its module 20. See FIG. 10A.

Figure 11:
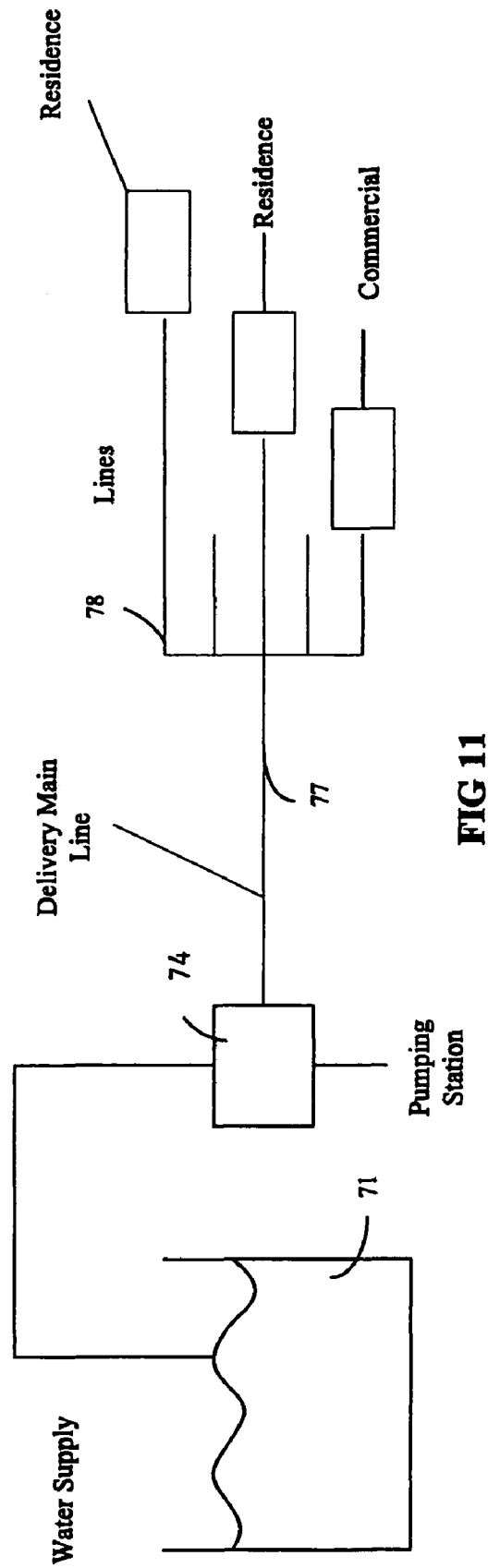
FIG. 11 is a diagram of an embodiment of a local water infrastructure from water supply to the residential or commercial locations where embodiments of the present invention may be deployed.

FIG. 11 shows a diagram of a typical exemplary pumping station with its infrastructure ending at a residential home. The water supply 71 may be a dam, lake, or aquifer(s). Pumps 74 deliver water using water delivery main lines 77 to neighborhoods. Lines 78 deliver the water to individual residences, businesses, apartments, schools, etc. One or more pumps 74 are used to deliver the required water demand depending upon the season and time of day. Adequate pumping is required to deliver usable water pressure. In rapidly expanding communities, the pumping and main line capabilities may be inadequate to deliver a constant water supply at adequate pressure. The watering restrictions are normally implemented to balance the water demand load. Using fewer or smaller pumps saves energy and maintenance.

FIG. 12 shows an embodiment of a module 20 having multiple internal drought stages programmable with an integrated dip 37 switch (dual in line package). In this embodiment, the switch 37 is connected to the module microprocessor. Five exemplary drought stages are labeled 1-5, with stage 1 possibly meaning no drought condition watering restrictions, stage 2 a mild drought watering schedule, and so on until stage 5 being the most extreme drought watering conditions and mandated watering schedules. Of course, other switches such as a multi-position slide switch, a small rotary switch, etc. may alternately be used for dip switch 37. An advantage to a hardware switch drought stage selection is that it does not require a front panel display or buttons for programming. These embodiments may have a display with data entry buttons, or no display or data entry buttons as described in FIG. 9. The module may also keep its own date and time with an internal clock to include daylight savings time and leap year adjustments. This would eliminate the need for a receiver for the NIST clock signal. This method of selecting the drought stages could be incorporated in the simplest embodiments of the module with an internal clock and no display or programming buttons and no external NIST time signal or wireless receiver. The drought stages may also be programmed from the front panel with programming buttons and a display. The advantage of a display is that it can show additional information for the user, but does add some cost.

FIG. 13 is a simplified block diagram of a centrally located transmitter 52 that is capable of sending wireless signals to embodiments of the present invention. Each such embodiment requires a receiver 29 for receiving the wireless signal from transmitter 52. The signal may include updated watering schedules, or may provide a simple "on" or "off" command to modules 20. In alternative embodiments, each module 20 may be independently addressable, so that the signal may be directed to individual modules, to different groups of modules, or to all modules within the area, as desired. Some embodiments of the module of the present invention may include only an addressable receiver 29 and an on/off switch 26 used to break the common line 19 from a controller 25. These embodiments are completely controlled by the broadcasts from the water authority. It is to be appreciated that in alternative embodiments, the broadcasts may be provided from other sources such as multiple transmitters provided in the affected area, mobile transmitters on vehicles of the authority, hand held transmitters, cellular or pager networks, or the like.

Other configurations of the present invention may include display and data entry buttons, battery powered or AC powered; without a display or data entry buttons and current time and date provided with an NIST signal; with a selectable watering schedules selection means such a dip switch to select even or odd street addresses, or watering groups, or any combination thereof. In the embodiment illustrated in FIG. 12, an internal drought stage selection means is provided. For example, if the SNWA has pre-set drought stages, all the drought stages may be incorporated within the device. This would eliminate the need for the SNWA to mail out data transfer devices for different stages of drought. Instead, the water authority would simply instruct the user to enable, for example, the stage 2 program incorporated within the module by either selecting the stage with front panel switch or programming, by flipping a dip switch 37 to select stage 2, etc.

Many "smart" controllers or smart add-on modules add the daily amount of water theoretically needed by the landscape vegetation root zone until a set threshold is reached. This is done to insure adequate root zone water penetration. When the threshold is reached, the controller is activated to open the valves and provide irrigation. However, the day or time that the irrigation threshold is reached may not be, and is frequently not, an allowed watering day. In such cases, the irrigation is omitted, and if subsequent threshold days fall several consecutive times on a non watering day, there may be an irrigation deficit detrimental to the landscape vegetation. Accordingly, several embodiments of the present invention include a feature of the module in the form of a display 34 or other indication that watering was attempted but prevented (skipped); in alternative embodiments, the feature may indicate the number of skipped watering attempts and/or the date or time of such attempt(s). The attempts at watering may be determined by the module which senses that the controller has come on, but because the output switch (e.g. common line) was open, no irrigation occurred.

First Example of an Application

The SNWA watering schedule (FIG. 2) is used in this example. The SNWA divides Clark County, Nevada into six watering groups A-F. Warnings and escalating fines are levied for violations from these regulations. While these schedules are mandatory, it is not practical to effectively police the 500,000 addresses within the SNWA jurisdiction. The SNWA estimates that less than 30% make an effort to comply with these limitations. In this example, the present invention is provided in the form of a small add-on module 20 having a display 22, data entry means (one or more buttons, switches, etc.) 23, or a selectable switch 37 (see FIGS. 1A-1C), an input wire from the common of any controller 31, and an output wire 32 to the common of the valves 30. It is preferred that module 20 be self powered and electrically isolated from controller 25 or from external power. This preferred embodiment makes module 20 electrically safe and immune from power and electrical surges. In addition, in this configuration, module 20 is easy to install and program. It is cost effective in terms of water conservation, and should eliminate fines due to violations of local watering schedule ordinances.

AC power from either the nearby controller (typical 24 volts AC) or from a 115 volt outlet may be used, but if so, the module 20 is no longer isolated and subject to failure due to primary power surges and may require professional electrical installation By way of example only, and without limiting the scope of the appended claims, a pre-programming of module 20 may be provided that includes the watering schedules established by the SNWA for groups A-F. The user installs the module 20 on the common output line 19 from an existing controller, and then enters the current date and time, and selects the watering group (A-F in this example) for the particular location where the module is installed, using a switch 37 or data input or programming buttons 23. The module is pre-programmed to conform to the watering restrictions for each of these six watering groups, so entry of a watering group will determine which program of watering restrictions the module 20 will use. During the summer, for example, from May 1-August 31, watering is permitted for any group any day of the week, but not between 11 a.m. and 7 p.m. (See FIG. 2.). During the spring and fall, groups can water any time of day, but only on Mondays, Wednesdays, and Fridays for groups A, C, and E. Groups B, D, and F can water on Tuesdays, Thursdays, and Saturdays. In alternative embodiments, the current calendar and time of day may be pre-programmed for the Clark County region governed by the SNWA, so only the watering group need be entered by the user.

Typically, every day is a watering day during the summer in Clark County. Therefore, in this example, during the spring and fall, the allowed watering days will automatically conform with the summer watering days. During the winter, while there is only one watering day allowed, it will also coincide with the summer schedule since every day during the summer was a watering day. Therefore, no change in programming is required by the homeowner, or landscape maintenance contractor for commercial projects. In alternative embodiments, automatic adjustments for daylight saving time and leap year may be included in the internal clock to make it even easier for the residential and commercial users.

In preferred embodiments, module 20 is self-powered, so household power failures, or surges from power lines should not affect the module 20. Because these embodiments are also isolated from the field, no lightning or solenoid caused transients should affect the module either, further improving the reliability and longevity of the module. Embodiments using low DC power operation, pose little or no safety concerns. The module 20 is designed to be installed by the homeowner because it is so simple to install (two wires to connect), and embodiments are so easy to program (enter water group). In some embodiments, the module may be provided in an even simpler configuration without a display and pre-programmed according to its water group designation.

In alternative embodiments, during non-watering periods, an icon could show on the display 22 (if provided) indicating that this is a non-watering period. In alternative embodiments, an override or bypass function 55 could be provided for emergency watering, during new lawn plantings to allow for germination or establishment, or for other special purposes. Even though module 20 is designed to have its battery operate the electronics and cutoff switch for as long as 10 years, in alternative embodiments a battery status indicator function 39 could be provided to indicate the state of the internal battery. For user friendliness, the allowed watering days for the current time of the year for the watering group assigned to the user could be displayed. In this way, the user can easily see if today is an allowed watering day, and when the next watering day will occur.

The mandatory use of such modules could provide nearly 100% compliance to the SNWA watering restrictions and could save 10% of all its total annual water usage in Southern Nevada. In addition, it should drastically reduce and/or eliminate virtually all fines due to violations, including elimination of the policing and administration of fines. Furthermore, landscape maintenance contractors will not have to return four additional times a year to each controller just to adjust for the seasonal programming changes; and homeowners can install the modules and not give them another thought for years on end.

While the SNWA program has been selected as an example, the same principle applies to other communities with mandatory governmental watering restrictions such as, for example, even or odd address groupings along with seasonal changes. A relatively simple change in software is all that is necessary to accommodate any community's or region's specific watering restrictions.

Second Example of an Application

In alternate embodiments, the modules 20 of the present invention may be provided pre-programmed with the mandated irrigation schedule for a particular community without a display or data entry buttons, as shown in FIG. 6. In these embodiments, the government mandated watering schedule for only one particular group is pre-programmed into the module 20, along with the time of day and calendar date, preferably including programming for daylight savings time and leap year. All modules containing the pre-programming for the particular group are given the same distinguishing characteristic (e.g., same size, shape, color, etc.). This allows these modules to be identified as corresponding to a particular watering group, or containing a particular set of pre-programmed instructions or watering schedule. Modules having different programming are given a different identification characteristic. Thus, for example, all modules that are red in color may be pre-programmed for watering group A; all modules that are blue in color may be pre-programmed for watering group B, etc. It is then simply a matter of providing each user with a correct module for the user's location to implement the correct watering restrictions at that location. It is to be appreciated that different characteristics or combinations of characteristics may be used to identify different programming in the module. For example, modules that are red in color may contain schedule A, blue in color contain schedule B, and modules that are square in shape may be used for even-numbered addresses, with modules that are round in shape for odd-numbered addresses. Thus, there may be modules that are both red in color and round in shape (schedule A for odd-numbered addresses), and modules that are red in color and square in shape (schedule A for even-numbered addresses). Multiple combinations of characteristics are contemplated in these embodiments of the invention.

In these embodiments, there is no programming required by the user. The water district provides a module with particular characteristics (e.g. blue, round, etc.) to the customers based upon the customer group or even/odd address, or other factor(s). The module contains the appropriate pre-programmed watering schedule(s) for that user's location. In some embodiments, a display may be provided which shows the pre-programmed time of day and date which can be adjusted by the user, or this information may be pre-programmed and not be adjustable by the user (with no need for data input or display). In alternative embodiments, the modules can be provided with the capability to receive the time of day and/or calendar signal from NIST. With current energy management technology and low power microprocessors, the internal battery may be of adequate capacity to operate the module for its effective life without need to change batteries. An override or bypass feature may be provided as an option for the convenience of the user for special situations when the watering schedule is not to be followed, such as new plantings or maintenance purposes.

In alternative embodiments, the modules may be pre-programmed with all of the possible watering schedules mandated by the local governmental authority (and/or additional watering schedules to allow for future changes in those restrictions). In these embodiments, it is possible to select a watering schedule by using a switch, button or other selection means 37 on the module 20. (See FIGS. 1A, 1B and 1C.). For example, and without limitation, a switch 37 on the module may be provided with six different positions, A-F, corresponding to the six watering groups of SNWA as shown in FIG. 1C. The user moves the switch to select the appropriate group (e.g. move the switch to "B"), and the module implements the pre-programmed watering restrictions of that group. It is to be appreciated that additional selections (and switch positions) may also be provided for unusual, emergency, maintenance or other situations. For example, the user's normal schedule (e.g. "B") may call for 5 days a week watering during the summer, but if a drought occurs, the local watering authority may allow only 3 days a week of landscape irrigation. This may be pre-programmed into the module, and the homeowner may simply select this program by moving switch 37 to a setting such as "Drought-B3" for 3-day watering during drought conditions in group B. It may be as simple as flipping a dip switch within the device to select the new drought plan being implemented. It is to be appreciated that multiple combinations of alternative schedules may be pre-programmed into the module, with corresponding switch settings to select them. In some embodiments, the switch setting may allow single or multiple sets of pre-programming to be selected (e.g. "Even-Drought-B" or "Odd-Drought-B", and the like). In other embodiments, the pre-programming for only a single group (as with the color-coded modules described previously) may be provided, plus a variety of alternative selections such as emergency, maintenance, etc.

Third Example of an Application

By way of example only, and without limiting the scope of the appended claims, the customers of the local water agency are provided with a water scheduling module of the present invention. However, because of the persistence of a drought, or in combination of the drought and rapidly expanding demand upon the pumping and delivery capacity of the locale, the water district requires stricter watering schedules that are not already pre-programmed into the modules. For example, the SNWA area, instead of restricting watering from 11 a.m. to 7 p.m. during the summer, this may be changed to 10 a.m. to 8 p.m. Or, instead of allowing watering seven days a week from May 1 to August 31, the summer season may be changed from June 1 to September 15. Or the SNWA may determine that Sundays are no longer an allowed watering day during the summer. (The Irrigation Association recommends deficit irrigation practice during drought years. It is recommended that up to a 20% deficit in irrigation is acceptable and not permanently detrimental to landscape vegetation. Following this guideline 1/7th reduction in irrigation during the summer in Clark County, for example, would be acceptable practice and would correspondingly save a significant amount of landscape irrigation water.) It would be difficult for homeowners to manually comply with these types of changes if they are not already pre-programmed into the modules, and providing a new set of modules could be prohibitively expensive and time consuming.

Should SNWA or any water district or authority wish to change the watering schedules for any reason (newly implemented schedules, changing drought conditions, additional stress upon the infrastructure, etc.), instead of replacing the modules 20 of the present invention, updates can be provided to embodiments of modules 20 of the present invention in a variety of different ways. In some of these embodiments, a small data storage device 36 is provided that contains the new or updated local water restrictions. Any suitable small data storage devices 36 may also be used, such as magnetic cards or strips, USB flash drives, etc. In some embodiments, the dimensions of this device 36 may be, for example, as small as about ½ inch square by 0.1 inch thick. The small data storage device 36 contains the new watering time of use schedules. It is preferably small enough to be mailed by the water authority with the water bill in an envelope. Upon receipt, the user causes these embodiments of module 20 to read the data on the device 36, for example, by plugging the device 36 into the module 20 and then pressing an "enter" button, swiping device 36 through a reader on the module, etc. The revised schedule could then be immediately implemented throughout the local water district at little or no appreciable cost.

These embodiments of the present invention make it easier to implement new watering schedules without replacing the module, and avoid asking the homeowner to (a) remove the module, (b) take it to their computer, (c) attach a cable to the module in order to (e) download the new schedule, and then (e) remount the module. An even less desirable method of programming is to ask the homeowner to remove the device and take it in to a reprogramming location. Not only is this not convenient, many users may not comply with the watering restrictions if they have to remove the unit from their residence.

It is to be appreciated that other embodiments of the invention, such as those in which the module contains a wireless receiver as discussed more fully below, may also be used in this example. However, wireless embodiments would add some cost to each module. However, while the module itself adds cost, the method of updating the module by wireless means may save time and virtually the entire cost of the data transfer device, and its mailing. It also makes the upgrading virtually instantaneous and not dependent upon the homeowner's performance, as simple as it may be. Each water district would need to weigh chances of requiring frequent upgrades versus a one time expense of a somewhat higher module cost and a broadcasting capability. The size of the water district and the possibility or probability of future upgrades would determine the method chosen by a community, water district, or governmental irrigation regulating agency, requiring each user to have a receiver that is continuously monitoring for the signal, which would require additional power. Other embodiments provide a connector or jack 27 on the module 20 into which a cable is inserted to download updated programming. The new programming may be provided via cable from any of a number of sources including the Internet, a local computer, a mobile hand-held device, or the like.

Conforming to restricted watering schedules not only conserves water, but also preserves the water delivery capabilities of most communities, saving considerable infrastructure cost upgrading to meet increasing populations, particularly in the western states. However, despite ET theory studies for the last 50 years, education by the EPA, Bureau of Water Reclamation, California Department of Water Resources, western water agencies, the Irrigation Association, and the Irrigation Center for Water Technology, and rebate enticements to convert to ET or weather based systems to conserve water, effective water conservation has not been achieved. A realistic goal of 60% compliance to restricted watering schedules using the present invention would be 600 times more effective than the 0.1% voluntary compliance to date with existing smart methods in terms of real water conservation.

Fourth Example of an Application

By way of example only, and without limiting the scope of the appended claims, in alternative embodiments, very simple and inexpensive versions of module 20 of the present invention are provided. As with other embodiments, the module 20 is attached to the output of any existing irrigation controller along the common line. In these simple embodiments, the module 20 has no display, no data entry buttons, and does not need time of day and date. In these embodiments, module 20 does not even need a (relatively expensive) power supply. A small lithium battery may be provided to operate the microprocessor and a double EPROM may keep the programmed watering schedules. The module may draw the majority of its power from either the existing irrigation controller low voltage (typically 24 VAC supply) and internally convert it to usable DC voltage to operate a built in radio receiver 29, electronics, and common line switching means.

In the simplest of these embodiments, a centrally placed transmitter operated by the local community or water agency wirelessly transmits an ON or OFF signal. The transmission may be by any suitable wireless means such as, without limitation, cellular, pager, radio, microwave or the like. Every module 20 in the local receiving area would be monitoring for this signal. When the local watering restrictions prohibit watering (e.g. 11:00 a.m.-6:00 p.m. every day), the "off" signal is sent, and all modules respond by braking the common line of the controller to which they are associated, preventing irrigation from taking place. When watering is allowed (e.g. after 6:00 p.m.) an "on" signal is then sent. No time of day or calendar is required within the device since the central location would keep that time, and the device is merely an ON or OFF module with a wireless receiver. FIG. 13 shows the general concept of these embodiments. These embodiments may also be used, for example, in case sufficient precipitation has fallen in the area, an "off" command may be transmitted to the entire community to disable all irrigation. With these "on/off" signals, no existing controller outfitted with the device can irrigate at prohibited times, since the common line to all the controller's valves will be cut off.

The next level of sophistication using these embodiments allows each module to be independently addressable. In these embodiments, each module has an internal address which is provided in the broadcast along with the ON or OFF command. The "on" and "off" commands could be provided in such a way that all modules are directed to respond to them, or they may be addressed to groups of modules or individual modules, as desired. For example, and without limitation, each remote module could be addressed with an even or odd address, or watering group, or the like, which then recognizes the central signal as being specific to itself, thereby controlling the ON or OFF output command differently depending on its address or watering group.

The cost and complexity of these embodiments of the module of the present invention are reduced even further by the elimination of a display and data entry buttons, and elimination of a sophisticated microprocessor. Very simple embodiments of the module of the present invention include only an addressable receiver and an on/off switch to break the common line from the controller, the module accessing power from the controller itself. Such embodiments would be completely controlled by broadcasts from the water authority. One significant advantage to the local water district is that the watering schedules may be instantly modified as the water supply and infrastructure allow, without having to manually re-program the modules. Current wireless technology is such that city-wide wireless data and command communications are not uncommon, relatively inexpensive, and reliable compared to the additional cost of paying for the additional complexity of microprocessors, programming, displays, data storage, etc.

Fifth Example of an Application

Instead of mounting a module 20 of the present invention at the controller, it could be mounted adjacent to a master valve for convenience. These embodiments only work with irrigation systems having a master valve 41 upstream of all slave valves 30 in the system that must be opened before water reaches the slave valves. See FIG. 6. In these embodiments, the module is installed on the electrical line to the master valve 41, and performs the same function as breaking the common wire to the slave valves 30, but instead breaks the line to the master valve 41. This method hydraulically disables the slave irrigation valves.

In alternative embodiments where a master valve 41 has been implemented with slave valves 30 in FIG. 6, and the default position of the master valve 41 may be open. In these cases, instead of the module 20 of the present invention breaking the common line when a non-watering time arrives, it sends a pulse to the solenoid on master valve 41 to close the valve. When a watering-allowed time arrives, another pulse is sent to the solenoid to re-open master valve 41.

It is to be noted that FIGS. 6 and 7 concern the use of a master valve, which is more common in commercial rather than residential use. The difference between these embodiments is that in FIG. 6, the module of this invention is in the electrical common line between the controller and the master valve, while in FIG. 7, the module operates to hydraulically close or open the master valve without breaking the common line. The module in this embodiment is mounted directly on the master valve and a latching solenoid powered by the module opens or closes the valve. The watering restrictions are still programmed within the module as before, and either a display can be programmed with the time and date, or an NIST time signal can perform this function. In the case of FIG. 7, the module would almost certainly be battery powered and may be mounted inside a valve box, if desired.

Sixth Example of an Application

In this example, the "big" picture is considered. One or more water reservoirs (dam, lake, aquifer, or the like) are used to store a local community's water supply. The water is used for agricultural, commercial, and domestic needs. With respect to domestic usage, landscape water use accounts for over 50% of that usage. Certain times of the day account for peak water demand such as early morning when showers are taken, breakfast is cooked, toilets are flushed, or clothes are washed. This would account for a relatively high water demand for domestic use between the hours of 6:00 a.m. and 8:00 a.m. It would therefore be desirable that landscape irrigation not occur during those hours in order to not increase the water pumping and delivery demand. There may also be multiple peak water demand times that place excessive burdens upon the pumping and delivery system. Higher water demand may require additional pumps to go on line, which would increase the power to deliver that higher demand. Consequently, by preventing landscape irrigation during peak hours, the pumping and delivery demands are eased, and adequate water pressure is more easily maintained, which improves irrigation efficiency by supplying a relatively stable and adequate water pressure. In addition, by limiting the watering days to certain days of the week, during certain times of the year, landscape water usage is automatically reduced. The result is better irrigation efficiency, which saves water, less irrigation, which saves additional water, and less pumping demand which saves energy and the need to add additional pumping and delivery capabilities, which saves significant infrastructure upgrading costs.

In this example, modules with wireless receiving capability allow for instant program updating or shut down of irrigation systems in case of rain or cold temperatures.

In embodiments that require no external device or special programming, each irrigation controller may be provided with a receiver and software capable of receiving a broadcast signal designating whether or not irrigation can take place. In addition to controlling peak time watering activity, if it is raining, for example, each remote controller can be instructed to not irrigate for a period of time. If the temperature falls below a certain level, near freezing, for safety reasons, the controllers may be ordered to suspend irrigation until the temperature reaches above a certain level. For water conservation, only certain watering days may be permitted depending upon the season. For infrastructure capability reasons, watering may be limited or prohibited during certain times of the day. In the less expensive case, an add-on module is preferred, in which the module instead of the controller has wireless receiving capability that is attached to the output of any irrigation controller that will allow or not allow irrigation as previously described. The advantage of this method is that the module can work with any brand of controller, and with any number of stations. In addition, the homeowner does not need to learn to program a new controller. Another advantage is that the water district may consider providing the module free of charge to the customers if it is at reasonable cost. This wireless method would also allow changes to the watering rules to be immediately provided to the customer's irrigation system.

Seventh Example of an Application

It is conceivable that a water district may want to upgrade the watering schedules by means of hand held wireless transmitters, or broadcasting the new water schedules by mobile means mounted on a driven vehicle which broadcasts the new watering restrictions area by area, or community wide. In a certain rapidly expanding area, for example, the water district may wish to alter the certain watering schedules without affecting the entire district. In these situations, the module 20 would be outfitted with a receiver that can accept the new program as the water district truck drives by the neighborhood. Only the modules with certain addresses or identity codes would be affected. This is an alternative to a general drought plan upgrade that may affect the entire region.

In other embodiments, the modules 20 may be outfitted with data ports or connector jacks into which a cable may be plugged. The user may then download updated watering restrictions via cable inserted into the connector from a variety of possible sources as directed by the local water authority, including without limitation, downloading from the Internet, a local computer, a hand-held device (brought to the module by a service person for the water authority), at a designated location established by the district for downloading of updated programming, or otherwise.

Eighth Example of an Application

In a simple and low cost form, an embodiment of the module of the present invention may be provided with no display or data entry switches or buttons. In these embodiments, the time of day and calendar, daylight saving time, and leap year may be internally controlled with an accurate oscillator and real time clock. The watering schedule for a given watering group is pre-programmed into a set of modules 20, and each module in that set is color coded (or given some other unique characteristic) for identification with that particular watering group. Other modules with a different pre-programmed watering schedule are given a different characteristic (color). The modules of these embodiments are self-battery powered to last for at least 10 years (the effective life of the module), or from power from the controller with an internal small lithium battery to keep time in case of power failure. The modules are provided to each user containing the pre-programmed schedule for their address or location. In alternative embodiments, a simple indicator such as an LED light can indicate whether this is a watering day or not, and/or an external push button 55 can provide the bypass function, and/or a visual signal 34 may be provided to indicate that watering was attempted during disabling of the valves. Modules of these embodiments attach with two wires to break the common from the controller to the valve(s). These modules automatically regulate the irrigation watering cycles.

Ninth Example of an Application

In these embodiments, the local water district or governmental agency has already provided their users with a form of the module of this invention. However, the agency determines that a change to the watering restrictions is needed in one or more parts of the community due to rapidly expanding housing. In this example, each module is equipped with a receiver that is monitoring for a signal. If AC power is continuously provided from either the controller or a 115 VAC outlet near the module, the receiver can continuously monitor for a wireless signal. In one scenario, a remote vehicle equipped with a transmitter can travel through the neighborhoods in question and wirelessly reprogram the local modules with the new watering restrictions without the need to access the module which is typically placed near the controller, which is frequently located in the garage. Using this method, selective reprogramming can be accomplished if each module is electronically addressed to respond to the new watering restrictions. In another scenario, as shown in FIG. 13, a central broadcast can selectively or globally reprogram all the modules with the new watering restrictions.

CONCLUSION

Heretofore, energy considerations have been the driving force to manage energy as provided by electric utilities. Smart controller technology has been encouraged to conserve water within the irrigation industry. Some water districts have adopted manually implemented watering restrictions to balance the watering demands for their existing infrastructure. No simple, inexpensive automated solution has been offered to date to accommodate water conservation, infrastructure limitations, and energy conservation in combination. The present invention offers this type of synergetic solution of all three critical resources.

Virtually all residential irrigation applications are AC powered. In general, AC powered controllers account for about 90% of all controllers installed, both residential and commercial. The other approximately 10% of irrigation systems do not have AC power available, so they are either battery powered, solar powered, ambient light powered, etc. The present invention is ideal for these applications because it does not require any additional energy from the existing DC powered controller (which may already have limited power). In general, modules of the present invention used with DC powered controllers could be programmed in the same way as modules connected to AC controllers. The major difference would be that internally, such modules would have a back biased diode 28 to perform the function as described in FIG. 5. In these embodiments, the module may be hermetically sealed so that it could be placed below ground level inside a valve box as is commonly done with battery powered valve box controllers.

In the case where the new or existing controller is a "smart" controller, the module can still be attached to break the common line and perform its watering schedules in addition to the controller's ET or other function. As noted earlier, however, it is recommended that since smart controllers are not fully compatible with time of use watering schedules, that such embodiments of the module of the present invention be able to inform or notify the user if watering schedules have been skipped. This may be accomplished using an indicator or signal 34, such as a light or LED, which indicates that watering was attempted by the controller 25 during a time when the module 20 was preventing watering.

The present invention is universal in limiting watering to specific watering schedules. It is totally independent of any environmental factors or ET. Its function is entirely dependent upon a specific irrigation schedule as mandated by a local community or region. It can be used with any AC or DC controller, conventional or smart, with any number of stations, in residential, commercial, or turf applications. It may be self powered for convenience, surge isolation, and safety. It is extremely simple to program and install, very cost effective, and will save much more real water rather than theoretical water savings due to ET theory. In addition, it will reduce or eliminate the policing and fining of violators, as well as visits by maintenance contractors simply to change irrigation programming as mandated by the water authority for the particular season of the year.

Finally, it is most important to note that one of the primary advantages of the present invention is automatic implementation of government mandated watering schedules. In the past, reducing energy consumption has been accomplished by relying on the user to manually make changes (such as re-setting a thermostat), water infrastructure improvements postponement has been done with manual reprogramming of existing controllers, and smart controllers have to be manually programmed with data entry of existing landscape conditions and the dependence of available ET data (transmitted or by adjacent weather station). In contrast, the present invention is an automated watering schedule governor that requires little or no setup by the user (other than perhaps entry of even/odd, or selecting a watering group), automatically enforcing watering restrictions instead of relying on homeowners or commercial users for manual compliance.

It is to be appreciated that different versions of the invention may be made from different combinations of the various features described above. In addition, any of the features of any of the embodiments disclosed herein may also be incorporated into embodiments of the invented adapted for use with master valves. It is to be understood that other variations and modifications of the present invention may be made without departing from the scope thereof. It is also to be understood that the present invention is not to be limited by the specific embodiments disclosed herein, but only in accordance with the appended claims when read in light of the foregoing specification.

What is claimed is:

1. A method of automatically regulating the times that irrigation is provided by a controller comprising the steps of:
   a. programming an electronic module with a schedule of allowed watering times established by a regulatory authority;
   b. providing said module in series on a common electrical output line between said controller and its associated at least one valve; and
   c. said module automatically disabling said at least one valve at times when watering is not allowed by temporarily breaking said common line during such times.

2. The method of claim 1 wherein said module further comprises a display and a data input means.

3. The method of claim 1 wherein a plurality of schedules of allowed watering times established by a regulatory authority are programmed into said module, and said method further comprises the step of selecting one of said schedules.

4. The method of claim 3 wherein a selection switch is provided on said module, and comprising the additional step of selecting one of said plurality of schedules using said selection switch.

5. The method of claim 1 wherein said module further comprises a signal for indicating the occurrence of a pulse on said common line at a time when said at least one valve was disabled.

6. The method of claim 1 wherein the programming of said module does not include any evapotranspiration or climate data.

7. The method of claim 1 wherein the programming of said module includes only date and time watering restrictions.

8. The method of claim 1 wherein said module is provided with an input for receiving updated allowed watering times.

9. The method of claim 8 wherein said input is in the form of a receiver for wirelessly receiving said updated watering times.

10. The method of claim 9 comprising the additional step of transmitting updated watering times to said module through said receiver.

11. The method of claim 8 wherein said input is in the form of a jack on said module for receiving an end of a cable over which said updated watering times are provided.

12. The method of claim 11 comprising the additional steps of attaching a cable to said jack and providing updated watering times over said cable.

13. The method of claim 8 wherein said input is in the form of a data port on said module for receiving a data transfer device from which said updated watering times are provided.

14. The method of claim 13 wherein said data transfer device is sized such that it may be included in a mailing to a user of said module.

15. The method of claim 13 comprising the additional steps of attaching a data transfer device to said port and providing updated watering times from said device.

16. The method of claim 8 wherein said input is in the form of a reader on said module for reading updated watering times data from a data transfer device.

17. The method of claim 16 comprising the additional step of reading said data transfer device to provide updated watering times from said device.

18. The method of claim 8 comprising the additional step of updating said watering times by one of the following: attaching a data transfer device to said input and providing updated watering times from said device; attaching a cable to said input and providing updated watering times over said cable; and transmitting updated watering times to said module through a receiver in said module.

19. The method of claim 1 wherein said module is powered by one of the group consisting of AC, DC, solar, ambient light, and combinations thereof.

20. The method of claim 1 wherein said module further comprises an override for said disabling step.

21. The method of claim 1 wherein said controller is non-AC powered, and a diode is provided in said module in parallel with said common output line.

22. A module for automatically regulating the output of an irrigation controller to comply with local watering schedules comprising:
   a. a power supply;
   b. a microprocessor programmed with a local watering schedule from a regulatory authority; and
   c. at least one output cutoff switch located on an output line between said controller and at least one valve.

23. The module of claim 22 further comprising a display and a data input.

24. The module of claim 22 wherein said device is powered by one of the group consisting of: AC, battery, solar, ambient light, and combinations thereof.

25. The module of claim 22 further comprising a bypass for said output cutoff switch.

26. The module of claim 22 further comprising a receiver and wherein said local watering schedule is updated by wireless means.

27. The module of claim 22 wherein said controller is non-AC powered, and a diode is provided in said module in parallel with said cutoff switch.

28. An apparatus for automatically regulating the output of an irrigation controller to at least one valve to comply with local watering schedules comprising:
   a. a module comprising a microprocessor in communication with a cutoff switch, said microprocessor containing a plurality of schedules of allowed watering times established by a regulatory authority and programming to automatically activate said cutoff switch at times when watering is not allowed according to said schedules;
   b. a first electrical line for connection between said cutoff switch and a common electrical output of said controller;
   c. a second electrical line for connection between said cutoff switch and a common electrical line leading to said at least one valve; and
   d. a means for selecting one of said plurality of schedules.

29. The apparatus of claim 28 further comprising an indicator on said module for signaling the occurrence of a pulse on said first electrical line at a time when said cutoff switch was activated.

30. The apparatus of claim 28 further comprising a display.

31. The apparatus of claim 28 wherein said module is battery powered.

32. The apparatus of claim 28 further comprising a bypass for said cutoff switch.

33. The apparatus of claim 28 wherein said module is provided with an input for receiving updates to said schedules of allowed watering times.

34. The apparatus of claim 33 wherein said input is in the form of a receiver for wirelessly receiving said updates.

35. The apparatus of claim 33 wherein said input is in the form of a jack on said module for receiving an end of a cable over which said updates are provided.

36. The apparatus of claim 33 wherein said input is in the form of a data port on said module for receiving a data transfer device from which said updates are provided.

37. The apparatus of claim 36 wherein said data transfer device is sized such that it may be included in a mailing to a user of said module.

38. The apparatus of claim 33 wherein said input is in the form of a reader on said module for reading updates from a data transfer device.

39. The apparatus of claim 28 wherein said controller is non-AC powered, and a diode is provided in said module in parallel with said cutoff switch.

40. A method for governing allowed irrigation watering times comprising the steps of:
   a. programming an electronic module with local watering restrictions from a regulatory authority;
   b. attaching said module directly to an existing irrigation controller; and
   c. said module automatically disabling an output of said controller to at least one irrigation valve in compliance with said watering restrictions.

41. A method of providing watering restrictions from a first location to at least one landscape irrigation controller at a second location comprising the steps of:
   a. connecting a module having a wireless receiver in series on a common output line of said at least one controller;
   b. wirelessly transmitting watering restrictions from said first location to said module; and
   c. regulating output of said at least one controller using said module based upon said watering restrictions.

42. An apparatus for regulating the output of an irrigation controller to at least one valve to comply with local watering schedules comprising:
   a. a module comprising a microprocessor in communication with a cutoff switch, a receiver in communication with said microprocessor for wirelessly receiving at least one schedule of allowed watering times established by a regulatory authority, and programming in said microprocessor to activate said cutoff switch at times when watering is not allowed according to said schedule;
   b. a first electrical line for connection between said cutoff switch and a common electrical output of said controller; and
   c. a second electrical line for connection between said cutoff switch and a common electrical line leading to said at least one valve.

43. An apparatus for regulating the output of an irrigation controller to at least one valve to comply with local watering schedules comprising:
   a. a module comprising a receiver in communication with a cutoff switch for wirelessly receiving signals for operation of said cutoff switch;
   b. a first electrical line for connection between said cutoff switch and a common electrical output of said controller; and
   c. a second electrical line for connection between said cutoff switch and a common electrical line leading to said at least one valve.

44. A method of updating a restricted watering schedule within a module directly connected to a controller comprising the steps of:
   a. engaging an updating device to an input on said module; and
   b. providing an updated watering schedule to said module through said device.

45. The method of claim 44 wherein said updating device is a data storage device, and said updated watering schedule is provided to said module from said data storage device.

46. The method of claim 44 wherein said updating device is a cable, and said updated watering schedule is provided to said module over said cable.

47. The method of claim 44 wherein said module further comprises a receiver, and said updated watering schedule is provided wirelessly from a hand held transmitting device to said module through said receiver.

48. A method of implementing watering restrictions established by a regulatory authority comprising the steps of:
   a. programming a plurality of electronic modules with said watering restrictions;
   b. providing said modules to persons with irrigation controllers located within a geographic area where such restrictions apply;
   c. installing said modules in series on common electrical output lines of said controllers and at least one valve associated therewith; and
   d. said modules automatically disabling said at least one valve at times when watering is not allowed according to said restrictions by temporarily breaking said common lines during such times.

49. The method of claim 48 wherein each of said modules further comprises an input, and comprising the additional step of updating said watering restrictions by one of the following: attaching a data transfer device to said input and providing updated watering restrictions from said device; attaching a cable to said input and providing updated watering restrictions over said cable; and wirelessly transmitting updated watering restrictions to said module through a receiver in said module.

50. A method of regulating the times that irrigation water is provided through a master valve comprising the steps of:
   a. programming an electronic module with a schedule of allowed watering times established by a regulatory authority;
   b. providing said module in series on a common electrical output line between a controller and said master valve; and
   c. said module automatically disabling said valve at times when watering is not allowed by temporarily breaking said common line during such times.

51. A method of regulating the times that irrigation water is provided through a master valve comprising the steps of:
   a. programming an electronic module with a schedule of allowed watering times established by a regulatory authority;
   b. electrically connecting said module to an electrical line leading to a solenoid on said master valve; and c. said module automatically disabling said valve at times when watering is not allowed by temporarily breaking said line.

52. A method of providing watering restrictions from a first location to a master valve at a second location comprising the steps of:
- a. connecting a module having a wireless receiver in series on a common output line between a controller and said master valve;
- b. wirelessly transmitting watering restrictions from said first location to said module; and
- c. regulating operation of said master valve using said module based upon said watering restrictions.

53. A method of providing watering restrictions from a first location to a master valve at a second location comprising the steps of:
- a. electrically connecting a module having a wireless receiver to a solenoid of said master valve;
- b. wirelessly transmitting watering restrictions from said first location to said module; and
- c. regulating operation of said master valve using said module based upon said watering restrictions by closing said valve when watering is not allowed.

54. A method of regulating the times that irrigation is provided by a direct current controller comprising the steps of:
- a. programming an electronic module with a schedule of allowed watering times established by a regulatory authority;
- b. providing said module with a cutoff switch in series on a common electrical output line between said controller and its associated at least one valve;
- c. providing a diode in a circuit in parallel with said cutoff switch; and
- d. said module automatically disabling said at least one valve at times when watering is not allowed by temporarily breaking said common line during such times.

55. A method of governing the output of an irrigation controller comprising the steps of: a. attaching a device containing locally set restricted watering schedules to the output of an existing irrigation controller; and b. cutting off at least one output of said controller based upon said at least one restricted watering schedule.

* * * * *